(12) United States Patent
Ueki et al.

(10) Patent No.: US 8,436,875 B2
(45) Date of Patent: May 7, 2013

(54) DISPLAY DEVICE

(75) Inventors: Shun Ueki, Osaka (JP); Kozo Nakamura, Osaka (JP); Tomohiko Mori, Osaka (JP); Kazunari Tomizawa, Osaka (JP); Yuichi Yoshida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 48 days.

(21) Appl. No.: 13/128,884

(22) PCT Filed: Nov. 5, 2009

(86) PCT No.: PCT/JP2009/005871
§ 371 (c)(1),
(2), (4) Date: May 12, 2011

(87) PCT Pub. No.: WO2010/055626
PCT Pub. Date: May 20, 2010

(65) Prior Publication Data
US 2011/0216109 A1 Sep. 8, 2011

(30) Foreign Application Priority Data
Nov. 13, 2008 (JP) ................ 2008-291442

(51) Int. Cl.
G09G 5/10 (2006.01)
(52) U.S. Cl.
USPC ........................................ 345/690
(58) Field of Classification Search .......... 345/690; 349/106
See application file for complete search history.

(56) References Cited

U.S. PATENT DOCUMENTS

| 4,800,375 | A | 1/1989 | Silverstein et al. | |
|---|---|---|---|---|
| 6,661,488 | B1 | 12/2003 | Takeda et al. | |
| 7,145,624 | B2 | 12/2006 | Kubo et al. | |
| 7,483,095 | B2 * | 1/2009 | Roth et al. | 349/106 |
| 7,495,722 | B2 * | 2/2009 | Roth et al. | 349/106 |
| 2004/0174389 | A1 | 9/2004 | Ben-David et al. | |
| 2005/0122294 | A1 | 6/2005 | Ben-David et al. | |

(Continued)

FOREIGN PATENT DOCUMENTS

| CN | 102105926 A | 6/2011 |
|---|---|---|
| EP | 1 931 127 A1 | 6/2008 |

(Continued)

OTHER PUBLICATIONS

English translation of Official Communication issued in corresponding International Application PCT/JP2009/005871, mailed on Jun. 30, 2011.

(Continued)

*Primary Examiner* — Fred Tzeng
(74) *Attorney, Agent, or Firm* — Keating & Bennett, LLP

(57) ABSTRACT

A multiple primary color display device which suppresses the reduction in the display quality when an input signal corresponding to green in an sRGB color space is input from outside is provided. A display device according to the present invention has a pixel defined by a plurality of sub pixels. The plurality of sub pixels include at least a red sub pixel for displaying red, a green sub pixel for displaying green, a blue sub pixel for displaying blue, and a yellow sub pixel for displaying yellow. When an input signal corresponding to green in the sRGB color space is input from outside, the display device according to the present invention provides display using the yellow sub pixel in addition to the green sub pixel.

24 Claims, 15 Drawing Sheets

U.S. PATENT DOCUMENTS

| | | |
|---|---|---|
| 2005/0190967 A1 | 9/2005 | Ok et al. |
| 2008/0238845 A1 | 10/2008 | Kanou |
| 2009/0135213 A1 | 5/2009 | Tomizawa et al. |
| 2009/0167657 A1 | 7/2009 | Tomizawa |
| 2011/0037929 A1* | 2/2011 | Roth et al. .................... 349/106 |
| 2011/0128309 A1* | 6/2011 | Miyazaki et al. ............. 345/690 |

FOREIGN PATENT DOCUMENTS

| | | |
|---|---|---|
| JP | 9-251160 A | 9/1997 |
| JP | 11-242225 A | 9/1999 |
| JP | 2001-209047 A | 8/2001 |
| JP | 2001-306023 A | 11/2001 |
| JP | 2003-043525 A | 2/2003 |
| JP | 2004-529396 A | 9/2004 |
| JP | 2005-295511 A | 10/2005 |
| JP | 2008-065174 A | 3/2008 |
| JP | 2008-242254 A | 10/2008 |
| WO | 2007/032133 A1 | 3/2007 |
| WO | 2007/075276 A1 | 7/2007 |
| WO | 2007/097080 A1 | 8/2007 |
| WO | 2008/012969 A1 | 1/2008 |

OTHER PUBLICATIONS

Pointer, "The Gamut of Real Surface Colours", Color Research and Application, vol. 5, No. 3, Fall 1980, pp. 145-155.

Moriya et al., "A Color Conversion Circuit of Wide Gamut Color Spaces for Multi-Primary Color LCDs", IDW '06, pp. 1997-2000.

Society for Information Display, 2005 International Symposium, Digest of Technical Papers, vol. XXXVI, Book II, Hynes Convention Center, Boston, Massachusetts, May 25-27, 2005, pp. 1210-1213.

Society for Information Display, 2006 International Symposium, Digest of Technical Papers, vol. XXXVII, Book II, Moscone Convention Center, San Francisco, California, Jun. 7-9, 2006, pp. 1221-1224.

FPD International 2005 Forum, "Improving LCD TV Color using Multi-Primary Technology", Oct. 19, 2005, 66 pages.

Official Communication issued in corresponding European Patent Application No. 09825880.9, mailed on Nov. 29, 2012.

Official Communication issued in corresponding European Patent Application No. 11004881.6, mailed on Nov. 29, 2012.

* cited by examiner

GRADATION LEVEL OF INPUT GREEN SIGNAL

— LUMINANCE WHICH SHOULD BE OUTPUT
○ LUMINANCE WHICH IS ACTUALLY OUTPUT

GRADATION LEVEL OF INPUT GREEN SIGNAL

DISPLAY DEVICE

TECHNICAL FIELD

The present invention relates to a display device, and specifically to a multiple primary color display device for providing display using four or more primary colors.

BACKGROUND ART

Currently, various types of display devices are used for various uses. In a general display device, one pixel is formed of three sub pixels respectively for displaying red, green and blue, which are three primary colors of light. Owing to this, color display is made possible.

However, a conventional display device has a problem that the range of displayable colors (referred to as the "color reproduction range") is narrow. FIG. 25 shows a color reproduction range of a conventional display device which provides display using three primary colors. FIG. 25 is an xy chromaticity diagram of an XYZ colorimetric system, and the triangle defined by three points, acting as apexes, corresponding to the three primary colors of red, green and blue represents the color reproduction range. In the diagram, colors of various objects existent in the natural world (see Non-patent Document 1) revealed by Pointer are plotted with "x". As understood from FIG. 25, there are colors which are not encompassed in the color reproduction range, and a display device for providing display using the three primary colors cannot display the colors of a part of the objects.

Thus, in order to broaden the color reproduction range of the display device, techniques have been proposed to increase the number of primary colors used for display to four or greater.

For example, Patent Document 1 discloses a liquid crystal display device 800 in which, as shown in FIG. 26, one pixel P is formed of six sub pixels R, G, B, Ye, C and M respectively for displaying red, green, blue, yellow, cyan and magenta. FIG. 27 shows a color reproduction range of the liquid crystal display device 800. As shown in FIG. 27, the color reproduction range represented by the hexagon defined by six points, acting as apexes, corresponding to the six primary colors nearly encompasses the colors of the objects. As seen from this, the color reproduction range can be broadened by increasing the number of primary colors used for display.

Patent Document 1 also discloses a liquid crystal display device in which one pixel is formed of four sub pixels respectively for displaying red, green, blue and yellow, and a liquid crystal display device in which one pixel is formed of five sub pixels respectively for displaying red, green, blue, yellow and cyan. By using four or more primary colors, the color reproduction range can be made broader than that of the conventional display device for providing display using the three primary colors. In this specification, display devices for providing display using four or more primary colors will be collectively referred to "multiple primary color display devices", and a liquid crystal display device for providing display using four or more primary colors will be referred to a "multiple primary color liquid crystal display device".

CITATION LIST

Patent Literature

Patent Document 1: Japanese PCT National Phase Laid-Open Patent Publication No. 2004-529396

Non-Patent Literature

Non-patent Document 1: M. R. Pointer, "The gamut of real surface colors," Color Research and Application, Vol. 5, No. 3, pp. 145-155 (1980)

SUMMARY OF INVENTION

Technical Problem

However, as a result of detailed studies conducted by the present inventors on the display quality of multiple primary color display devices, it was found that a sufficiently high display quality cannot be obtained merely by increasing the number of primary colors. For example, when an input signal corresponding to green in an sRGB color space is input from outside to a multiple primary color display device, the luminance of green which is actually displayed by the pixel is made significantly lower than the luminance of green which should be displayed.

The present invention, made in light of the above problem, has an object of providing a multiple primary color display device which suppresses the reduction in the display quality when an input signal corresponding to green in the sRGB color space is input from outside.

Solution to Problem

A display device according to the present invention is a display device comprising a pixel defined by a plurality of sub pixels. The plurality of sub pixels include at least a red sub pixel for displaying red, a green sub pixel for displaying green, a blue sub pixel for displaying blue, and a yellow sub pixel for displaying yellow. When an input signal corresponding to green in an sRGB color space is input from outside, display is provided using the yellow sub pixel in addition to the green sub pixel.

In a preferable embodiment, the plurality of sub pixels further include a cyan sub pixel for displaying cyan. When the input signal is input, the display device according to the present invention provides display using the cyan sub pixel in addition to the green sub pixel and the yellow sub pixel.

In a preferable embodiment, increasing ratios of gradation levels of the green sub pixel, the yellow sub pixel and the cyan sub pixel with respect to an increase of a gradation level of the input signal are different between a first range of gradation level of the input signal, which is from a minimum level to a prescribed intermediate level, and a second range of gradation level of the input signal, which is from the prescribed intermediate level to a maximum level.

In a preferable embodiment, when the gradation level of the input signal is the prescribed intermediate level, the gradation level of the green sub pixel is the maximum level, and the increasing ratio of the green sub pixel in the second range is zero.

In a preferable embodiment, in the first range, hue, chroma and lightness of green corresponding to the input signal substantially match hue, chroma and lightness of a color displayed by the pixel.

In a preferable embodiment, in the second range, the lightness of green corresponding to the input signal substantially matches the lightness of the color displayed by the pixel.

In a preferable embodiment, in the second range, the hue of green corresponding to the input signal substantially matches the hue of the color displayed by the pixel.

In a preferable embodiment, when the input signal is input, in the second range, the display device according to the present invention provides display using the blue sub pixel in addition to the green sub pixel, the yellow sub pixel, and the cyan sub pixel.

In a preferable embodiment, when the input signal is input, in the second range, the display device according to the present invention does not use the blue sub pixel for display.

In a preferable embodiment, in the second range, the lightness of the color displayed by the pixel is lower than the lightness of green corresponding to the input signal.

In a preferable embodiment, in the second range, the hue of green corresponding to the input signal substantially matches the hue of the color displayed by the pixel.

In a preferable embodiment, in the second range, the hue, chroma and lightness of the color displayed by the pixel are constant.

In a preferable embodiment, the increasing ratios of the yellow sub pixel and the cyan sub pixel in the second range are zero.

In a preferable embodiment, the prescribed intermediate level is a gradation level at which a Y value of green corresponding to the input signal is 0.3 or greater where the Y value in an XYZ colorimetric system of white displayed by the pixel is 1.

In a preferable embodiment, increasing ratios of gradation levels of the yellow sub pixel and the cyan sub pixel with respect to an increase of a gradation level of the input signal are different between a first range of gradation level of the input signal, which is from a minimum level to a first intermediate level, and a second range of gradation level of the input signal, which is from the first intermediate level to a maximum level. An increasing ratio of a gradation level of the green sub pixel with respect to the increase of the gradation level of the input signal is different between a third range of gradation level of the input signal, which is from the minimum level to a second intermediate level higher than the first intermediate level, and a fourth range of gradation level of the input signal, which is from the second intermediate level to the maximum level.

In a preferable embodiment, when the gradation level of the input signal is the second intermediate level, the gradation level of the green sub pixel is the maximum level, and the increasing ratio of the green sub pixel in the fourth range is zero.

In a preferable embodiment, in the first range, hue, chroma and lightness of green corresponding to the input signal substantially match hue, chroma and lightness of a color displayed by the pixel.

In a preferable embodiment, in the second range, the hue of green corresponding to the input signal substantially matches the hue of the color displayed by the pixel.

In a preferable embodiment, the first intermediate level is a gradation level at which a Y value of green corresponding to the input signal is 0.3 or greater where the Y value in an XYZ colorimetric system of white displayed by the pixel is 1.

Alternatively, a display device according to the present invention is a display device comprising a pixel defined by a plurality of sub pixels. The plurality of sub pixels include at least a red sub pixel for displaying red, a green sub pixel for displaying green, a blue sub pixel for displaying blue, and a yellow sub pixel for displaying yellow. When an input signal corresponding to green in an sRGB color space is input from outside, display is provided using only the green sub pixel in a first range of gradation level of the input signal, which is from a minimum level to a prescribed intermediate level, and display is provided using the yellow sub pixel in addition to the green sub pixel in a second range of gradation level of the input signal, which is from the prescribed intermediate level to a maximum level.

In a preferable embodiment, an increasing ratio of a gradation level of the green sub pixel with respect to an increase of the gradation level of the input signal is different between the first range and the second range.

In a preferable embodiment, when the gradation level of the input signal is the prescribed intermediate level, the gradation level of the green sub pixel is the maximum level, and the increasing ratio of the green sub pixel in the second range is zero.

In a preferable embodiment, the plurality of sub pixels further include a cyan sub pixel for displaying cyan. In the second range, the display device according to the present invention provides display using the cyan sub pixel in addition to the green sub pixel and the yellow sub pixel.

In a preferable embodiment, when the gradation level of the input signal is the maximum level, chromaticity values x and y and the Y value in the XYZ colorimetric system of the color displayed by the pixel fulfill the relationships of $0.25 \leq x \leq 0.35$, $0.45 \leq y \leq 0.70$, and $0.3 \leq Y \leq 0.8$, where the Y value when the pixel displays white is 1.

Advantageous Effects of Invention

According to the present invention, a multiple primary color display device which suppresses the reduction in the display quality when an input signal corresponding to green in the sRGB color space is input from outside is provided.

DESCRIPTION OF EMBODIMENTS

Hereinafter, an embodiment of the present invention will be described with reference to the drawings. The present invention is not limited to the following embodiment.

Figure 1:
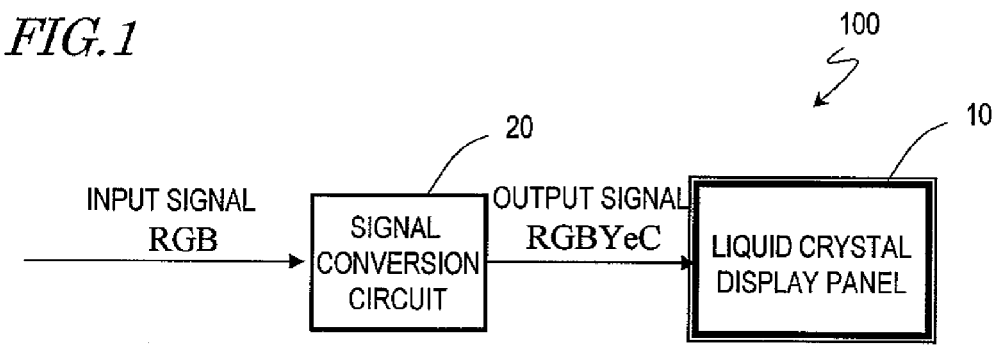
FIG. 1 is a block diagram schematically showing a liquid crystal display device 100 in a preferable embodiment of the present invention.

FIG. 1 shows a liquid crystal display device 100 in this embodiment. As shown in FIG. 1, the liquid crystal display device 100 is a multiple primary color liquid crystal display device including a liquid crystal display panel 10 and a signal conversion circuit 20 and providing color display using four or more primary colors.

Figure 2:
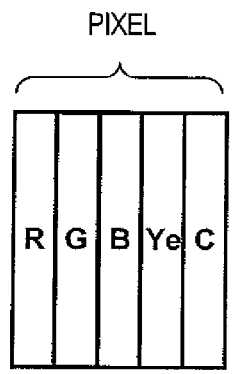
FIG. 2 shows an example of pixel structure of the liquid crystal display device 100.

The liquid crystal display device 100 includes a plurality of pixels arranged in a matrix. Each of the pixels is defined by a plurality of sub pixels. FIG. 2 shows an example of pixel structure of the liquid crystal display device 100. In the example shown in FIG. 2, the plurality of sub pixels defining each pixel are a red sub pixel R for displaying red, a green sub pixel G for displaying green, a blue sub pixel B for displaying blue, a yellow sub pixel Ye for displaying yellow, and a cyan sub pixel C for displaying cyan.

The types, number and arrangement of the sub pixels defining one pixel are not limited to those shown in FIG. 2. The plurality of sub pixels defining one pixel only need to include at least the red sub pixel R, the green sub pixel B, the blue sub pixel B, and the yellow sub pixel Ye.

The signal conversion circuit 20 converts an input video signal into a multiple primary color signal corresponding to four or more primary colors. For example, as shown in FIG. 1, the signal conversion circuit 20 converts an input signal (video signal) of an RGB format including components representing the respective luminances of red, green and blue into a multiple primary color signal including components representing the respective luminances of red, green, blue, yellow and cyan. The format of the input signal is not limited to the RGB format, and may be an XYZ format, a YCrCb format or the like.

The liquid crystal display panel 10 receives the multiple primary color signal generated by the signal conversion circuit 20, and a color corresponding to the multiple primary color signal is displayed by the pixels. The liquid crystal display panel 10 may use any of various display modes, and may preferably use, for example, a vertical alignment mode (VA mode) which can realize a wide viewing angle characteristic. Specifically, as the vertical alignment mode, an MVA (Multiple-domain Vertical Alignment) mode disclosed in Japanese Laid-Open Patent Publication No. 11-242225 or a CPA (Continuous Pinwheel Alignment) mode disclosed in Japanese Laid-Open Patent Publication No. 2003-43525 is usable. A panel of the MVA mode or the CPA mode includes a vertical alignment type liquid crystal layer in which liquid crystal molecules are aligned vertical with respect to the substrates in the absence of the voltage. Display of a wide viewing angle is realized by the liquid crystal molecules being tilted in a plurality of orientations in each sub pixel when a voltage is applied. Needless to say, another display mode such as a TN (Twisted Nematic) mode, an IPS (In-Plane Switching) mode or the like is usable.

The liquid crystal display device 100 in this embodiment has a feature in the display form when an input signal corresponding to green in the sRGB color space (substantially the same as green by the EBU format) is input from outside. Hereinafter, an input signal corresponding to green in the sRGB color space will also be referred to simply as the "green signal". When a green signal is input to a display device for providing display using three primary colors (three primary color display device), display is provided such that the luminances of the red sub pixel R and the blue sub pixel B are zero and the luminance of the green sub pixel G is of a prescribed level. Accordingly, the green signal is represented as (R,G,B) =(0,X,0). Here, "X" is an integer corresponding to the number of bits of the signal. Since an 8-bit signal is used in this embodiment, X is 0 to 255. Hereinafter, the magnitude of the X value will be referred to as the "gradation level of the green signal".

Hereinafter, the display form of the liquid crystal display device 100 when a green signal is input thereto will be specifically described. Before that, a reason why the luminance of green displayed by the pixel is significantly decreased when a green signal is input to a conventional multiple primary color display device will be described with reference to FIG. 28 through FIG. 30.

Figure 28:
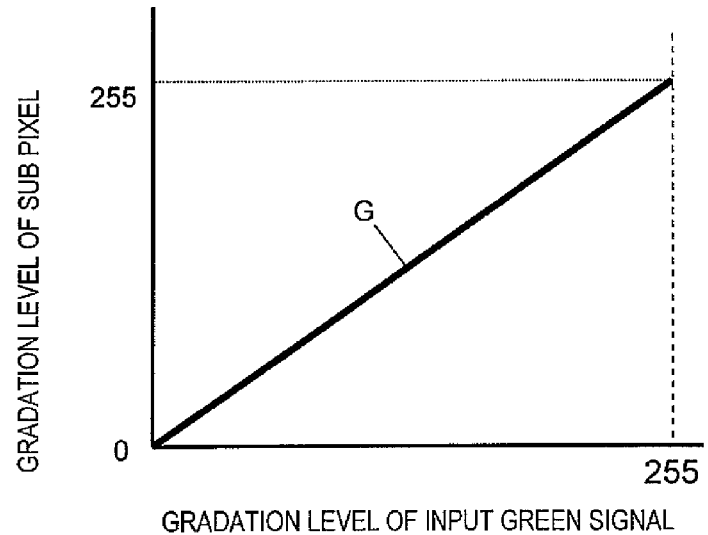
FIG. 28 is a graph showing the relationship between the gradation level of an input green signal (input gradation level) and the gradation level of a green sub pixel (output gradation level) in the conventional example.
Figure 29:
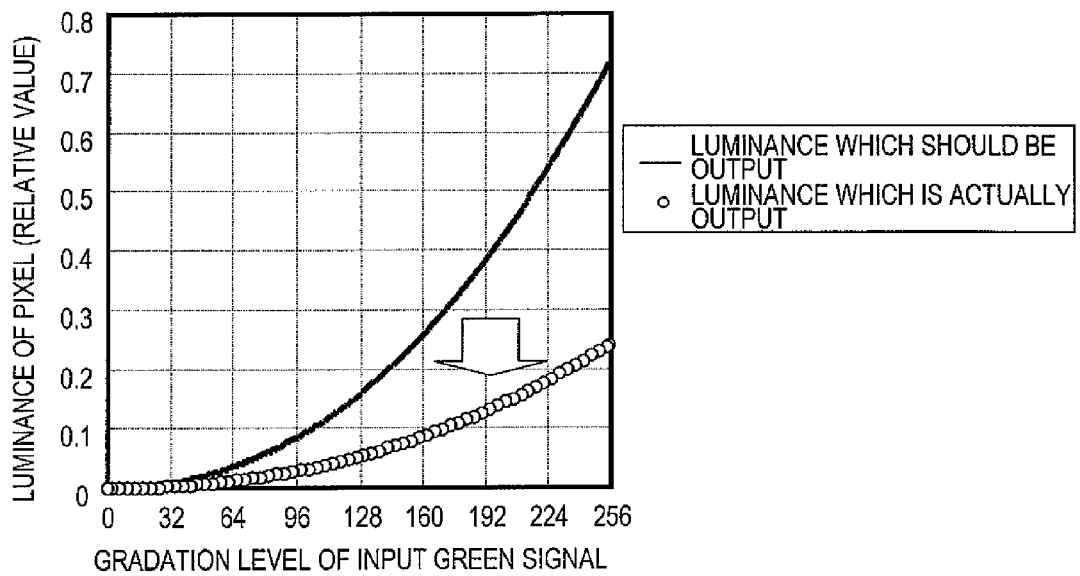
FIG. 29 is a graph showing the relationship between the gradation level of the green signal and the luminance of the pixel (relative value) in the conventional example.
Figure 30:
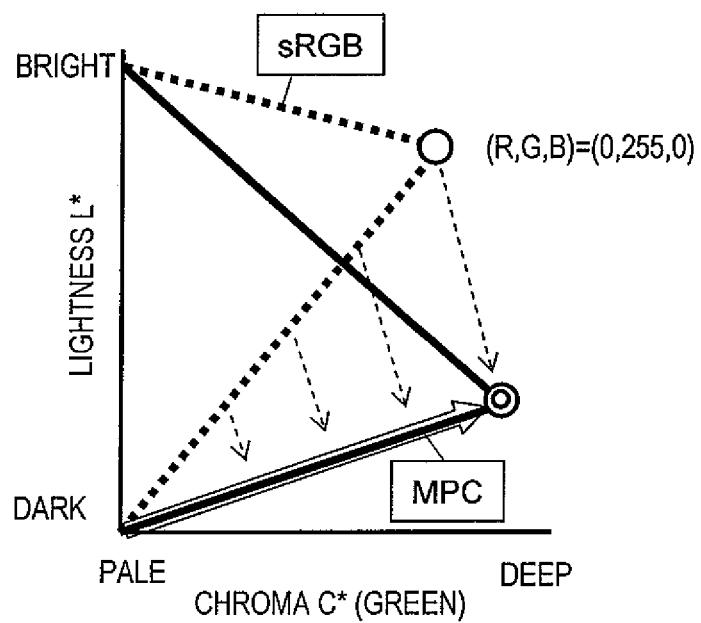
FIG. 30 is a graph showing the C*-L* characteristics of the color displayed by the pixel (the relationship between the chroma and the lightness of the hue corresponding to green in the sRGB) in the conventional example.

FIG. 28 is a graph showing the relationship between the gradation level of the input green signal (input gradation level: X mentioned above) and the gradation level of the green sub pixel G (output gradation level). FIG. 29 is a graph showing the relationship between the gradation level of the input green signal and the luminance of the pixel (relative value). FIG. 29 shows the luminance of the pixel which should be output and the luminance of the pixel which is actually output (when γ=2.2). FIG. 30 is a color tone diagram in an L*C*h colorimetric system, and is a graph in which the horizontal axis represents the chroma C* and the vertical axis represents the lightness L* regarding the hue angle h corresponding to green in the sRGB color space. In FIG. 30, the range of the sRGB color space is represented with the dotted line, and the color reproduction range of the multiple primary color display device is represented with the solid line. The white arrow in FIG. 30 represents a locus of the color displayed by the pixel when the gradation level of the green signal is changed from the minimum level to the maximum level. The circle and double circle in FIG. 30 respectively represent green which should be displayed and the color which is actually displayed when a green signal having the maximum gradation level is input.

When a green signal is input to the conventional multiple primary color display device, as shown in FIG. 28, the gradation level of the green signal is the gradation level of the green sub pixel G. Namely, the luminances of the sub pixels other than the green sub pixel G are zero regardless of the gradation level of the green signal. At this point, as shown in FIG. 29, the luminance of the pixel which is actually output is significantly lower than the luminance of the pixel which should be output. A reason for this is as follows. When the number of primary colors used for display is increased, the number of sub pixels per pixel is increased. Therefore, the area size of each sub pixel is inevitably reduced, and so the area size of the green sub pixel for displaying green is also reduced. Accordingly, as shown in FIG. 30, the lightness of green displayed by the pixel is lower than the lightness of green in the sRGB color space.

As described above, in the conventional multiple primary color display device, when a green signal is input, display is provided using only the green sub pixel G. Therefore, the luminance (lightness) of green which is actually displayed by the pixel is significantly decreased.

The liquid crystal display device 100 in this embodiment provides display using also the sub pixel(s) other than the green sub pixel G when a green signal (input signal corresponding to green in the sRGB color space) is input from outside. Specifically, when a green signal is input, the liquid crystal display device 100 provides display using the yellow sub pixel Ye in addition to the green sub pixel G. When necessary, the cyan sub pixel C and the blue sub pixel G are also used to provide display. Accordingly, in the liquid crystal display device 100 in this embodiment, the sub pixel(s) other than the green sub pixel also contribute(s) to the display provided when the green signal is input. Therefore, the decrease in the luminance can be suppressed, and so the reduction in the display quality can be suppressed.

Hereinafter, specific examples of the display form when a green signal is input to the liquid crystal display device 100 will be described.

EXAMPLE 1

Table 1 shows the chromaticity values x and y and the luminance ratio of the primary colors respectively represented by the red sub pixel R, the green sub pixel G, the blue sub pixel B, the yellow sub pixel Ye and the cyan sub pixel C in this example. The chromaticity values x and y and the value of the luminance ratio shown in Table 1 are the same also in the following examples.

TABLE 1

|  | Luminance ratio | x | y |
| --- | --- | --- | --- |
| R | 16.3% | 0.679 | 0.307 |
| Ye | 41.9% | 0.462 | 0.522 |
| G | 23.8% | 0.235 | 0.631 |
| C | 11.4% | 0.133 | 0.342 |
| B | 6.6% | 0.144 | 0.053 |

Figure 3:
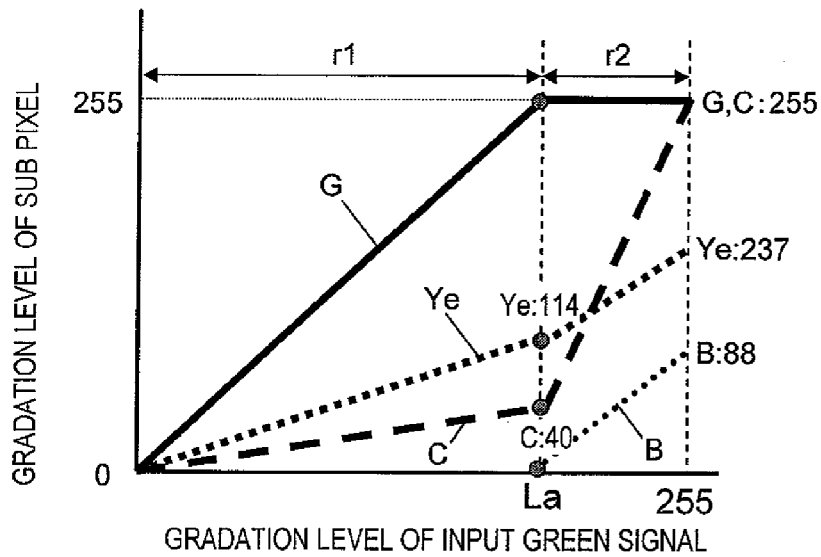
FIG. 3 is a graph showing the relationship between the gradation level of an input green signal (input gradation level) and the gradation level of each of sub pixels (output gradation level) in Example 1.

FIG. 3 shows the relationship between the gradation level of an input green signal (input gradation level) and the gradation level of each sub pixel (output gradation level) in this example. In the example shown in FIG. 3, when the gradation level of the green signal is in a first range r1 from the minimum level (i.e., zero) to a prescribed intermediate level La, display is provided using the green sub pixel G, the yellow sub pixel Ye and the cyan sub pixel C. By contrast, when the gradation level of the green signal is in a second range r2 from the intermediate level La to the maximum level (i.e., 255), display is provided using the green sub pixel G, the yellow sub pixel Ye, the cyan sub pixel C and also the blue sub pixel B.

As shown in FIG. 3, increasing ratios of the gradation levels of the green sub pixel G, the yellow sub pixel Ye and the cyan sub pixel C with respect to an increase of the gradation level of the green signal (the increasing ratios correspond to the gradients of the straight lines shown in FIG. 3, and hereinafter will be referred to also as the "output increasing ratios") are different between the first range r1 and the second range r2.

The output increasing ratio of the green sub pixel G is lower in the second range r2 than in the first range r1, and is more specifically zero in the second range r2. Namely, the gradation level of the green sub pixel G increases as the gradation level of the green signal increases, reaches the maximum level (i.e., 255) at the intermediate level La of the green signal, and stays constant after that.

By contrast, the output increasing ratio of the yellow sub pixel Ye is higher in the second range r2 than in the first range r1. The output increasing ratio of the cyan sub pixel C is also higher in the second range r2 than in the first range r1. In addition, in the first range r1, the output increasing ratio of the yellow sub pixel Ye is higher than that of the cyan sub pixel C. In the second range r2, the output increasing ratio of the cyan sub pixel C is higher than that of the yellow sub pixel Ye. Therefore, when the gradation level of the green signal is the intermediate level La, the gradation level of the yellow sub pixel Ye is higher than that of the cyan sub pixel C. When the gradation level of the green signal is the maximum level (255), the gradation level of the cyan sub pixel C is higher than that of the yellow sub pixel Ye.

When the gradation level of the green signal is the intermediate level La (192 in this example), the gradation levels of the yellow sub pixel Ye and the cyan sub pixel C are, for example, 114 and 40 respectively. When the gradation level of the green signal is the maximum level, the gradation levels of the blue sub pixel B, the yellow sub pixel Ye and the cyan sub pixel C are, for example, 88, 237 and 255 respectively.

Figure 4:
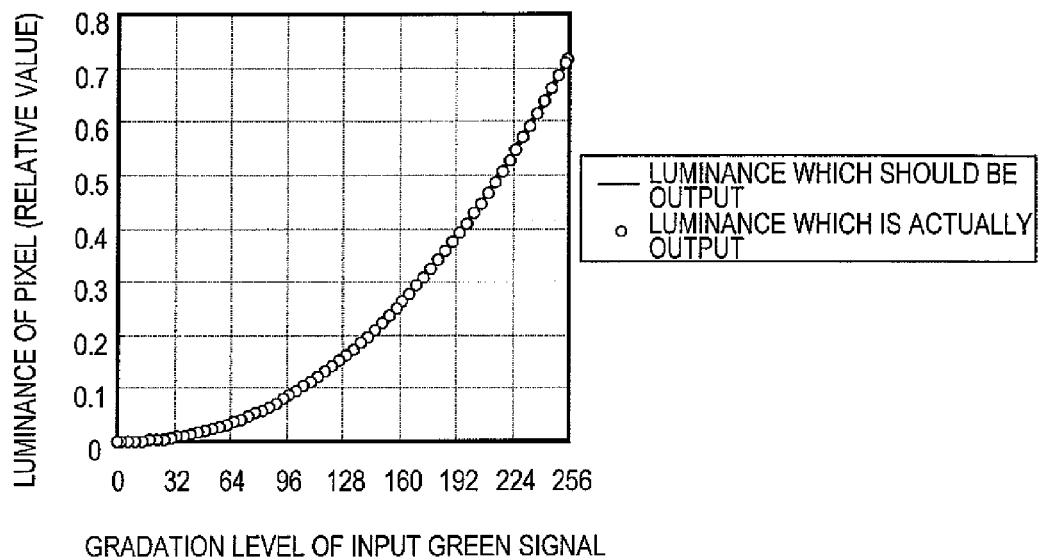
FIG. 4 is a graph showing the relationship between the gradation level of the green signal and the luminance of the pixel (relative value) in Example 1.
Figure 5:
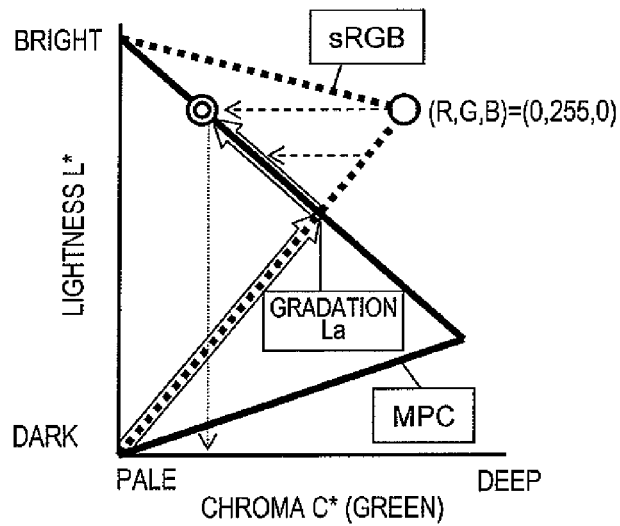
FIG. 5 is a graph showing the C*-L* characteristics of the color displayed by the pixel (the relationship between the chroma and the lightness of the hue corresponding to green in the sRGB) in Example 1.

FIG. 4 shows the relationship between the gradation level of the green signal and the luminance of the pixel (relative value) when the display is provided as shown in FIG. 3. FIG. 5 shows the C*-L* characteristics of the color displayed by the pixel (the relationship between the chroma and the lightness of the hue corresponding to green in the sRGB) also when the display is provided as shown in FIG. 3.

As shown in FIG. 4, the luminance which is actually output substantially matches the luminance which should be output. Therefore, as shown in FIG. 5, the lightness of the color displayed by the pixel substantially matches the lightness of green in the sRGB. As understood from that the locus of the color displayed by the pixel is represented in one color tone diagram (FIG. 5), the hue of the color displayed by the pixel substantially matches the hue of green in the sRGB. As further understood from FIG. 5, when the gradation level of the green signal is in the range from the minimum level to the intermediate level La (i.e., in the first range r1), the chroma of the color displayed by the pixel substantially matches the chroma of green in the sRGB.

Accordingly, when the display is provided as in this example, in the first range r1, the hue, chroma and lightness of green corresponding to the green signal (namely, green which should be displayed) substantially match the hue, chroma and lightness of the color actually displayed by the pixel. In the second range r2, the hue and lightness of green corresponding to the green signal substantially match the hue and lightness of the color actually displayed by the pixel. Namely, in the first range r1, all of the hue, chroma and lightness can be output with fidelity. In the second range r2, the hue and lightness can be output with fidelity. Therefore, the reduction in the display quality when an input signal corresponding to green in the sRGB color space is input from outside is suppressed.

Figure 6:
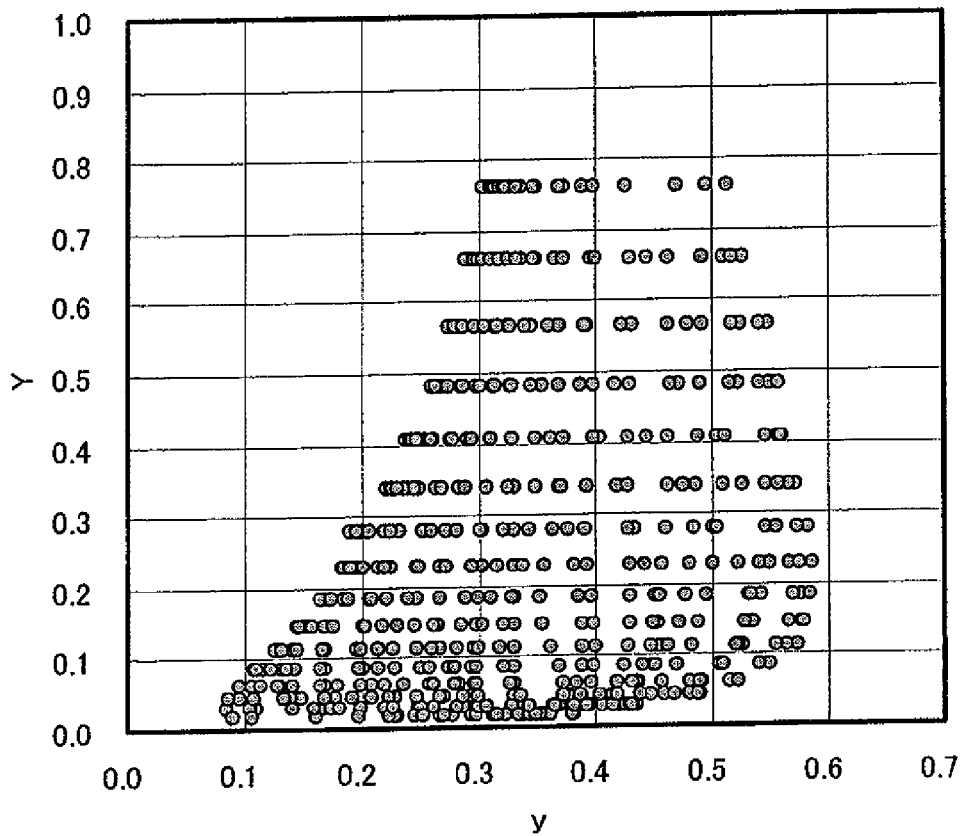
FIG. 6 is a graph showing plotted object colors of Pointer (i.e., existent colors) in which the horizontal axis represents the y coordinate in the XYZ colorimetric system and the vertical axis represents the Y value.

It is preferable that the intermediate level La, which is a termination end of the first range r1 (the range in which all of the hue, chroma and lightness can be reproduced with fidelity) is a gradation level at which the Y value of green to be displayed is 0.3 or greater where the Y value in the XYZ colorimetric system of white displayed by the pixel is 1. FIG. 6 is a graph of plotted object colors of Pointer (i.e., existent colors) in which the horizontal axis represents the y coordinate in the XYZ colorimetric system and the vertical axis represents the Y value. As shown in FIG. 6, in the range of $Y \leq 0.3$, there are existent colors in the vicinity of green in the sRGB (nearly y=0.6). It is understood that signals corresponding to such colors are possibly input. By setting the intermediate level La to such a level that $Y \geq 0.3$, the existent colors in the vicinity of green in the sRGB can be reproduced with fidelity.

As described above, in this example, in the first range r1, the hue, chroma and lightness of green corresponding to the green signal substantially match the hue, chroma and lightness of the color actually displayed by the pixel. Namely, green corresponding to the green signal and green displayed by the pixel substantially match each other. In this specification, the expression that the colors "substantially match each other" means that the color difference $\Delta E^*ab$ in an $L^*a^*b^*$ colorimetric system is 5 or less. The color difference $\Delta E^*ab$ is defined by $\Delta L^*$, $\Delta a^*$ and $\Delta b^*$, which are differences in the coordinates $L^*$, $a^*$ and $b^*$ in the $L^*a^*b^*$ colorimetric system. Specifically, it is represented as $\Delta E^*ab=[(\Delta L^*)^2+(\Delta a^*)^2+(\Delta b^*)^2]^{1/2}$. The color difference $\Delta E^*ab=5$ is of a degree at which the difference between two colors is recognized only where the two colors are put side by side.

In the example shown in FIG. 3, in the first range r1, the output increasing ratio of the yellow sub pixel Ye is higher than that of the cyan sub pixel C; and in the second range r2, the output increasing ratio of the cyan sub pixel C is higher than that of the yellow sub pixel. Ye. Which of the output increasing ratios of the yellow sub pixel Ye and the cyan sub pixel C is higher or lower is not limited to this. Depending on the specifications of the liquid crystal display panel 10, the output increasing ratio of the cyan sub pixel C may be higher than that of the yellow sub pixel Ye in the first range r1, and the output increasing ratio of the yellow sub pixel Ye may be higher than that of the cyan sub pixel C in the second range r2.

The gradation levels of the yellow sub pixel Ye and the cyan sub pixel C when the gradation level of the green signal is the intermediate level La are not limited to the values shown in FIG. 3 (114, 40). The gradation levels of the blue sub pixel B, the yellow sub pixel Ye and the cyan sub pixel C when the gradation level of the green signal is the maximum level are not limited to the values shown in FIG. 3 (88, 237, 255).

EXAMPLE 2

Figure 7:
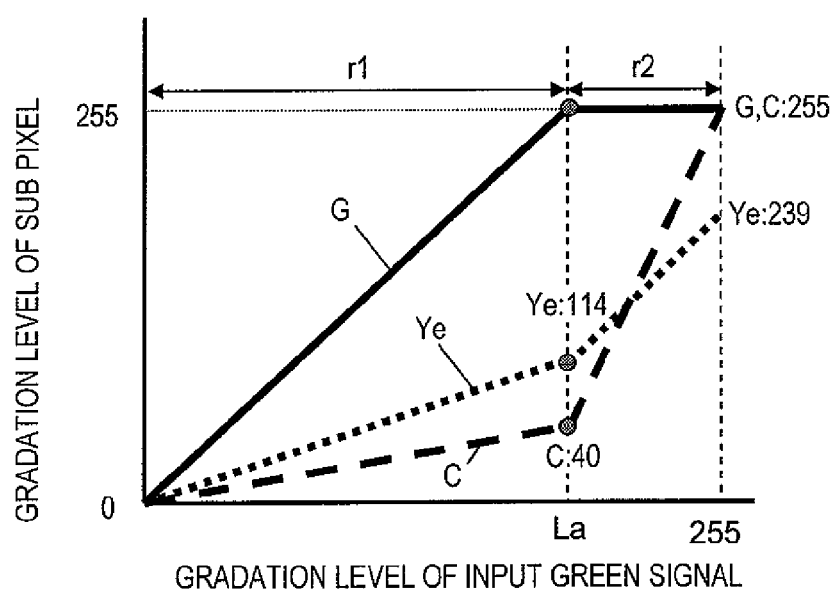
FIG. 7 is a graph showing the relationship between the gradation level of an input green signal (input gradation level) and the gradation level of each of sub pixels (output gradation level) in Example 2.

FIG. 7 shows the relationship between the gradation level of an input green signal (input gradation level) and the gradation level of each sub pixel (output gradation level) in this example. Unlike in the example shown in FIG. 3, in the example shown in FIG. 7, the blue sub pixel is not used for display in the second range r2. Namely, in the example shown in FIG. 7, when the gradation level of the green signal is in the first range r1 and also in the second range r2, display is provided using only the green sub pixel G, the yellow sub pixel Ye and the cyan sub pixel C.

When the display is provided as in the example shown in FIG. 7 also, the luminance actually output substantially matches the luminance which should be output. Therefore, the lightness of the color displayed by the pixel substantially matches the lightness of green in the sRGB. In the example shown in FIG. 3, in the second range r2, the chroma of the color displayed by the pixel is significantly lower than the chroma of green in the sRGB (see FIG. 5). By contrast, in the example shown in FIG. 7, the chroma can be kept at a certain level even in the second range r2.

Figure 8:
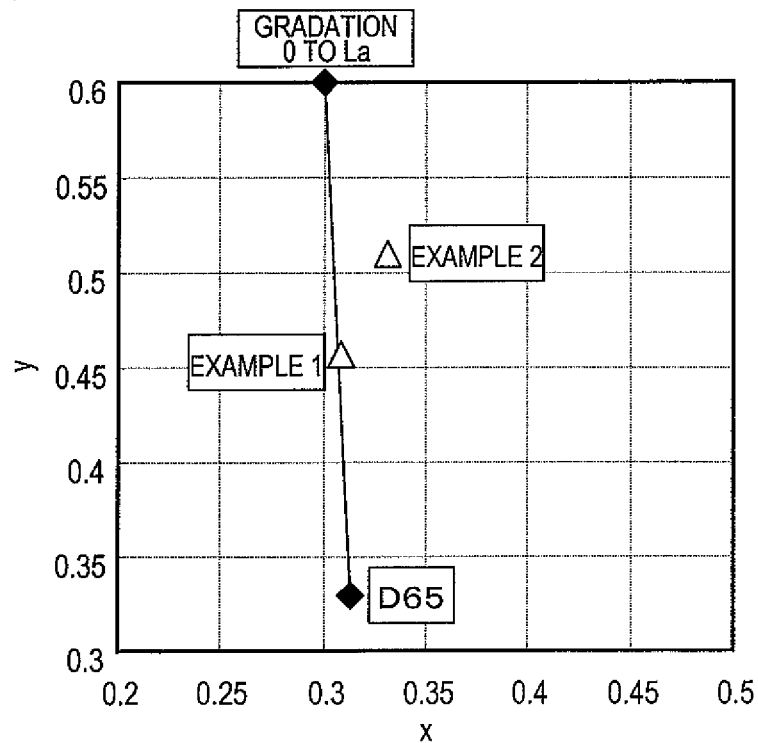
FIG. 8 is a graph showing the chromaticity values x and y of the color displayed by the pixel when the green signal of the maximum level is input in Examples 1 and 2.

FIG. 8 shows the chromaticity values x and y of the color displayed by the pixel when a green signal of the maximum level is input in the example shown in FIG. 3 (Example 1) and the example shown in FIG. 7 (Example 2). FIG. 8 also shows the chromaticity of the color displayed by the pixel when a green signal of a level in the first range r1 (gradation level: 0 to La) (same in Examples 1 and 2) and the chromaticity of white light from a D65 light source (standard light source having approximately the same color temperature as the sunlight).

As shown in FIG. 8, in Example 1, the chromaticity obtained when the green signal of the maximum level is input is between the chromaticity obtained when the green signal of the gradation level of 0 to La is input and the chromaticity of the D65 light source. Namely, the chromaticity obtained when the green signal of the maximum level is input is shifted toward the chromaticity of the white light from the chromaticity obtained when the green signal of the gradation level of 0 to La is input. This means that the chroma is decreased. By contrast, in Example 2, the amount of shift of the chromaticity obtained when the green signal of the maximum level is input with respect to the chromaticity obtained when the green signal of the gradation level of 0 to La is input is smaller than that in Example 1. This means that the decrease in the chroma is suppressed.

As seen from this, in Example 2, the decrease in the chroma in the second range r2 can be more suppressed than in Example 1. In Example 2, through, the chromaticity obtained when the green signal of the maximum level is input is off the straight line connecting the chromaticity obtained when the green signal of the gradation level of 0 to La is input and the chromaticity of the D65 light source. This means that the hue is deviated. Namely, in Example 2, the chroma can be kept at a certain level, whereas the hue is deviated. By contrast, in Example 1, the chromaticity obtained when the green signal of the maximum level is input is on the straight line connecting the chromaticity obtained when the green signal of the gradation level of 0 to La is input and the chromaticity of the D65 light source. As understood from this, the hue is not deviated. Accordingly, in the second range r2, it is preferable to provide the display as in Example 1 when the hue is considered more important and to provide the display as in Example 2 when the chroma is considered more important.

In the example shown in FIG. 7, in the first range r1, the output increasing ratio of the yellow sub pixel Ye is higher than that of the cyan sub pixel C; and in the second range r2, the output increasing ratio of the cyan sub pixel C is higher than that of the yellow sub pixel Ye. Which of the output increasing ratios of the yellow sub pixel Ye and the cyan sub pixel C is higher or lower is not limited to this. Depending on the specifications of the liquid crystal display panel 10, the output increasing ratio of the cyan sub pixel C may be higher than that of the yellow sub pixel Ye in the first range r1, and the output increasing ratio of the yellow sub pixel Ye may be higher than that of the cyan sub pixel C in the second range r2.

The gradation levels of the yellow sub pixel Ye and the cyan sub pixel C when the gradation level of the green signal is the intermediate level La (192 in this example) are not limited to the values shown in FIG. 7 (114, 40). The gradation levels of the yellow sub pixel Ye and the cyan sub pixel C when the gradation level of the green signal is the maximum level are not limited to the values shown in FIG. 7 (239, 255).

EXAMPLE 3

Figure 9:
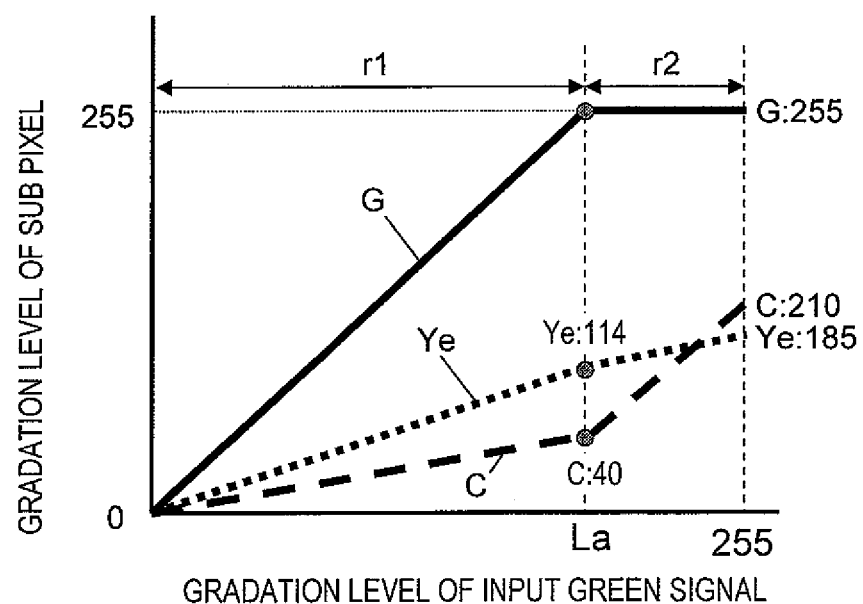
FIG. 9 is a graph showing the relationship between the gradation level of an input green signal (input gradation level) and the gradation level of each of sub pixels (output gradation level) in Example 3.

FIG. 9 shows the relationship between the gradation level of an input green signal (input gradation level) and the gradation level of each sub pixel (output gradation level) in this example. In the example shown in FIG. 9, display is provided using the green sub pixel G, the yellow sub pixel Ye and the cyan sub pixel C both in the first range r1 and the second range r2.

As shown in FIG. 9, the increasing ratios of the gradation levels of the green sub pixel G, the yellow sub pixel Ye and the cyan sub pixel C are different between the first range r1 and the second range r2.

The output increasing ratio of the green sub pixel G is lower in the second range r2 than in the first range r1, and is more specifically zero in the second range r2. Namely, the gradation level of the green sub pixel G increases as the gradation level of the green signal increases, reaches the maximum level (i.e., 255) at the intermediate level La of the green signal, and stays constant after that.

The output increasing ratio of the yellow sub pixel Ye is lower in the second range r2 than in the first range r1, but is not zero in the second range r2. The output increasing ratio of the cyan sub pixel C is higher in the second range r2 than in the first range r1. In addition, in the first range r1, the output increasing ratio of the yellow sub pixel Ye is higher than that of the cyan sub pixel C. In the second range r2, the output increasing ratio of the cyan sub pixel C is higher than that of the yellow sub pixel Ye. Therefore, when the gradation level of the green signal is the intermediate level La, the gradation level of the yellow sub pixel Ye is higher than that of the cyan sub pixel C. When the gradation level of the green signal is the maximum level (255), the gradation level of the cyan sub pixel C is higher than that of the yellow sub pixel Ye. When the gradation level of the green signal is the intermediate level La (192 in this example), the gradation levels of the yellow sub pixel Ye and the cyan sub pixel C are, for example, 114 and 40 respectively. When the gradation level of the green signal is the maximum level, the gradation levels of the yellow sub pixel Ye and the cyan sub pixel C are, for example, 185 and 210 respectively.

Figure 10:
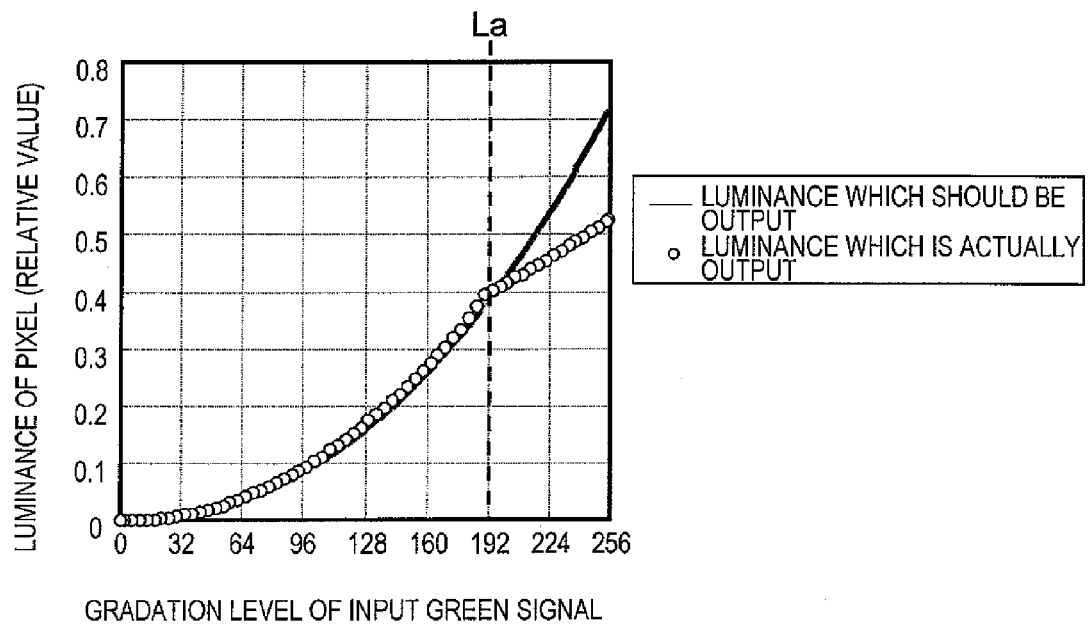
FIG. 10 is a graph showing the relationship between the gradation level of the green signal and the luminance of the pixel (relative value) in Example 3.
Figure 11:
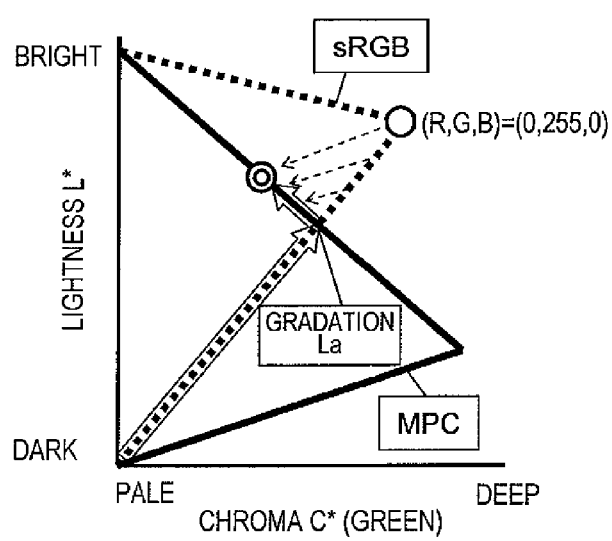
FIG. 11 is a graph showing the C*-L* characteristics of the color displayed by the pixel (the relationship between the chroma and the lightness of the hue corresponding to green in the sRGB) in Example 3.

FIG. 10 shows the relationship between the gradation level of the green signal and the luminance of the pixel (relative value) when the display is provided as shown in FIG. 9. FIG. 11 shows the $C^*$-$L^*$ characteristics of the color displayed by the pixel (the relationship between the chroma and the lightness of the hue corresponding to green in the sRGB) also when the display is provided as shown in FIG. 9.

As shown in FIG. 10, when the gradation level of the green signal is in the range from the minimum level (0) to the intermediate level La (192 in this example), the luminance which is actually output substantially matches the luminance which should be output. By contrast, when the gradation level of the green signal is in the range from the intermediate level La to the maximum level (255), the luminance which is actually output is lower than the luminance which should be output. Therefore, as shown in FIG. 11, the lightness of the color displayed by the pixel substantially matches the lightness of green in the sRGB in the first range r1, but is lower than the lightness of green in the sRGB in the second range r2.

In addition, as understood from FIG. 11, the chroma of the color displayed by the pixel substantially matches the chroma of green in the sRGB in the first range r1, but is lower than the chroma of green in the sRGB in the second range r2. It should be noted that as understood from a comparison of FIG. 11 and FIG. 5, the decrease in the chroma in the second range r2 in this example is smaller than that in Example 1. In addition, as understood from that the locus of the color displayed by the pixel is represented in one color tone diagram (FIG. 11), the hue of the color displayed by the pixel substantially matches the hue of green in the sRGB.

Figure 12:
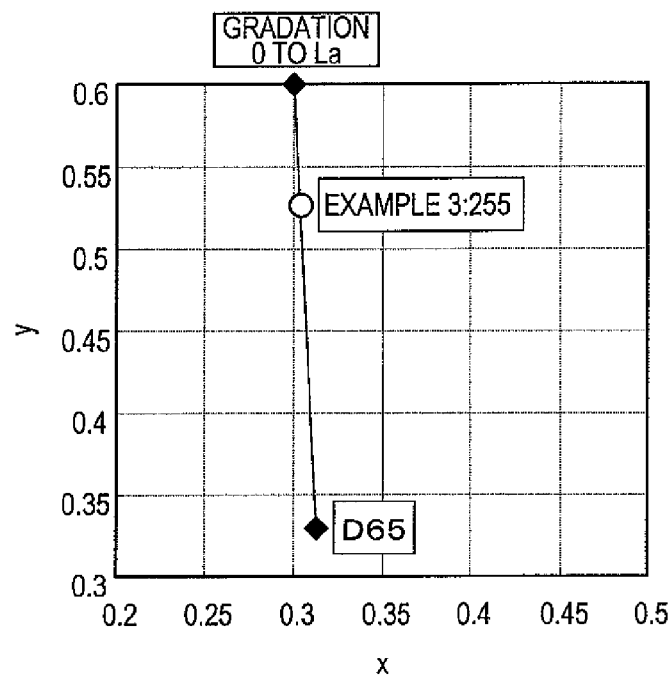
FIG. 12 is a graph showing the chromaticity values x and y of the color displayed by the pixel when the green signal of the maximum level is input in Example 3.

FIG. 12 shows the chromaticity values x and y of the color displayed by the pixel when a green signal of the maximum level (255) is input in the example shown in FIG. 9 (Example 3). FIG. 12 also shows the chromaticity of the color displayed by the pixel when the green signal of a level in the first range r1 (gradation level: 0 to La) and the chromaticity of white light from the D65 light.

As shown in FIG. 12, the chromaticity obtained when the green signal of the maximum level is input is between the chromaticity obtained when the green signal of the gradation level of 0 to La is input and the chromaticity of the D65 light source. The chromaticity obtained when the green signal of the maximum level is input is shifted toward the chromaticity of the white light from the chromaticity obtained when the green signal of the gradation level of 0 to La is input. It should be noted that as understood from a comparison of FIG. 12 and FIG. 8, the amount of shift is smaller than that in Example 1. This means that the decrease in the chroma is suppressed. The chromaticity obtained when the green signal of the maximum level is input is on the straight line connecting the chromaticity obtained when the green signal of the gradation level of 0 to La is input and the chromaticity of the D65 light source. This means that the hue is not deviated.

As described above, when the display is provided as in this example, in the second range r2, the lightness is slightly decreased, but the decrease in the chroma can be suppressed and the hue is not deviated. Namely, according to this example, in the first range r1, all of the hue, chroma and lightness can be output with fidelity; and in the second range r2, the hue can be output with fidelity while the chroma and lightness can be each kept at a certain level.

In the example shown in FIG. 9, in the first range r1, the output increasing ratio of the yellow sub pixel Ye is higher than that of the cyan sub pixel C; and in the second range r2, the output increasing ratio of the cyan sub pixel C is higher than that of the yellow sub pixel Ye. Which of the output increasing ratios of the yellow sub pixel Ye and the cyan sub pixel C is higher or lower is not limited to this. Depending on the specifications of the liquid crystal display panel 10, the output increasing ratio of the cyan sub pixel C may be higher than that of the yellow sub pixel Ye in the first range r1, and the output increasing ratio of the yellow sub pixel Ye may be higher than that of the cyan sub pixel C in the second range r2.

In the example shown in FIG. 9, the output increasing ratio of the yellow sub pixel Ye is lower in the second range r2 than in the first range r1. Alternatively, the output increasing ratio of the yellow sub pixel Ye may be higher in the second range r2 than in the first range r1. In the example shown in FIG. 9, the output increasing ratio of the cyan pixel C is higher in the second range r2 than in the first range r1. Alternatively, the output increasing ratio of the cyan sub pixel C may be lower in the second range r2 than in the first range r1.

The gradation levels of the yellow sub pixel Ye and the cyan sub pixel C when the gradation level of the green signal is the intermediate level La are not limited to the values shown in FIG. 9 (114, 40). The gradation levels of the yellow sub pixel Ye and the cyan sub pixel C when the gradation level of the green signal is the maximum level are not limited to the values shown in FIG. 9 (184, 210).

Figure 13:
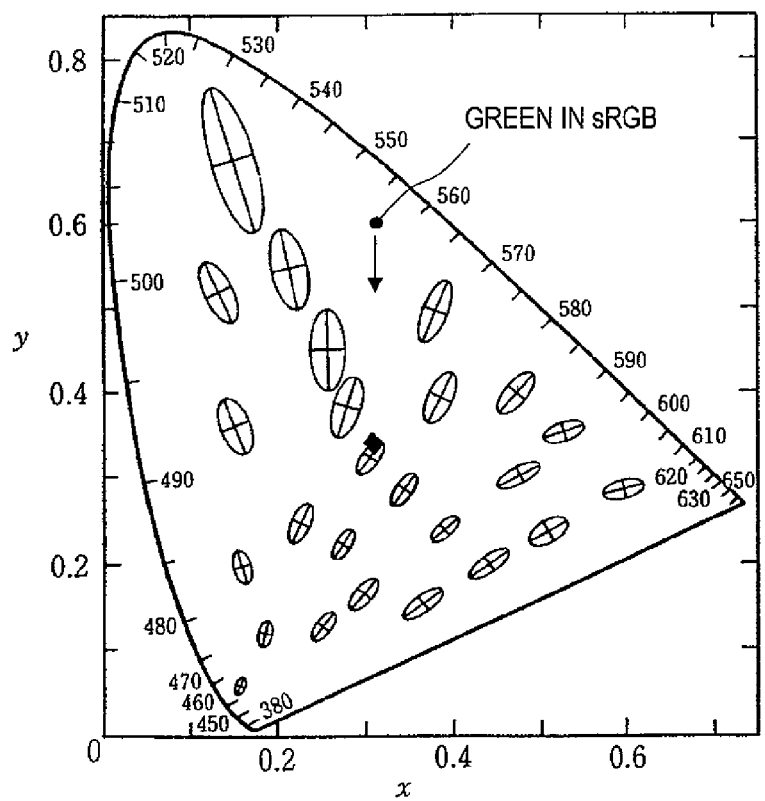
FIG. 13 is an xy chromaticity diagram showing the Mac-Adam ellipses.

As understood from the above, in the second range r2, as the gradation level of the green signal increases, the chroma decreases toward white. It is preferable that the shift direction of the chromaticity at this point is in the longer axis direction of the MacAdam ellipses. FIG. 13 shows the MacAdam ellipses in the xy chromaticity diagram. The MacAdam ellipses refer to areas on a chromaticity diagram in each of which the color appears the same. It should be noted, though, in FIG. 13, the MacAdam ellipses are shown 10 times larger than the actual sizes thereof. By arranging the shift direction of the chromaticity to be the longer axis direction of the MacAdam ellipses (arrow in FIG. 13), the decrease in the chroma becomes less likely to be recognized as a color difference.

Figure 14:
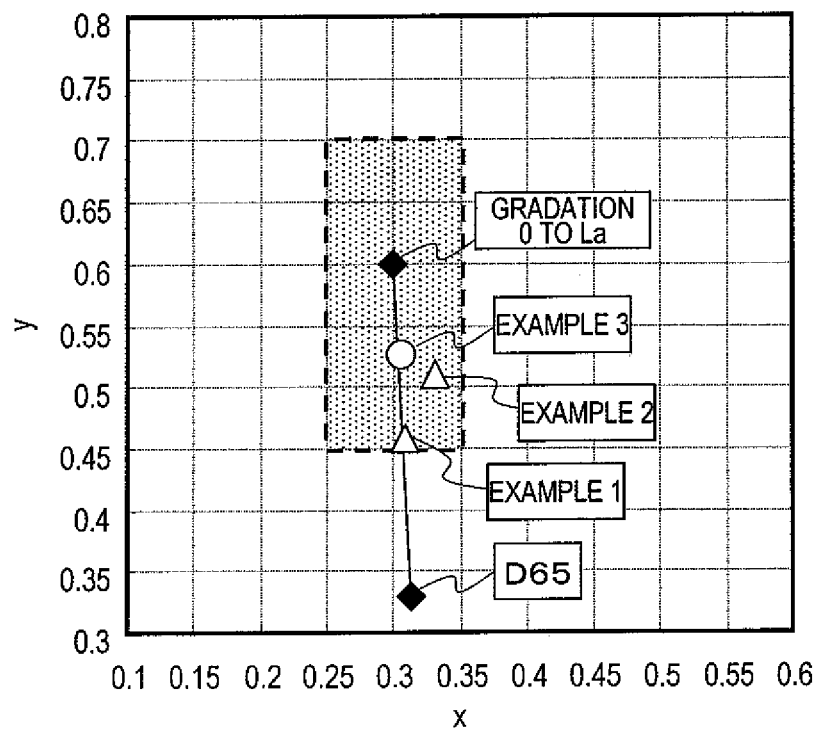
FIG. 14 is a graph showing the chromaticity values x and y of the color displayed by the pixel when the green signal of the maximum level is input in Examples 1, 2 and 3.

FIG. 14 shows the chromaticity values x and y of the color displayed by the pixel when a green signal of the maximum level (255) is input in Examples 1, 2 and 3. From the viewpoint of suppressing the reduction in the display quality (caused by the deviation of green actually displayed from green to be displayed) at a high gradation level more certainly, it is preferable that the chromaticity values x and y obtained when the green signal of the maximum level is input are, as shown in FIG. 14, in the ranges of $0.25 \leq x \leq 0.35$ and $0.45 \leq y \leq 0.70$. In addition, it is preferable that the Y value obtained when the green signal of the maximum level is input is in the range of $0.3 \leq Y \leq 0.8$ where the Y value obtained when the pixel displays white is 1. Accordingly, it is preferable that the chromaticity values x and y and the Y value in the XYZ colorimetric system of the color displayed by the pixel when the gradation level of the green signal is the maximum level fulfill the relationships of $0.25 \leq x \leq 0.35$, $0.45 \leq y \leq 0.70$, and $0.3 \leq Y \leq 0.8$. This is applicable to the following examples as well as to Examples 1, 2 and 3 described above.

EXAMPLE 4

Figure 15:
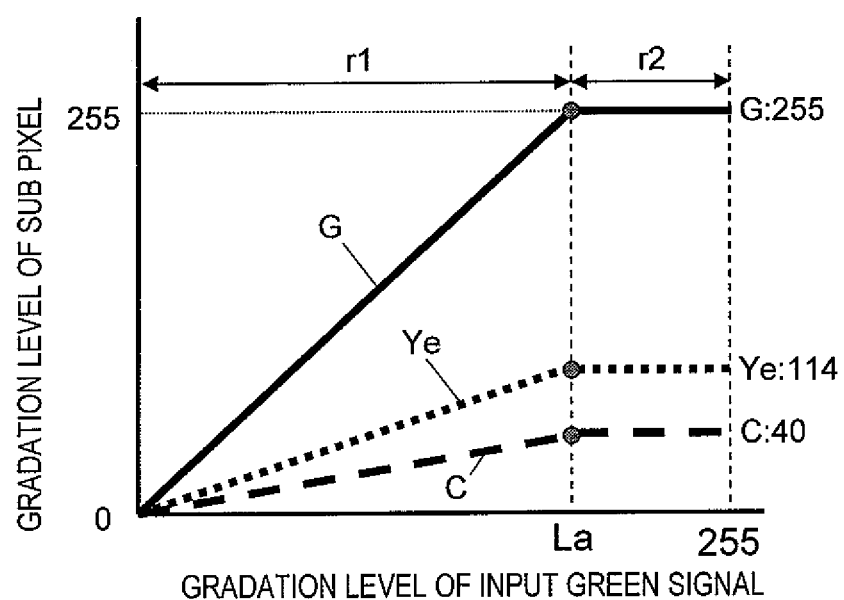
FIG. 15 is a graph showing the relationship between the gradation level of an input green signal (input gradation level) and the gradation level of each of sub pixels (output gradation level) in Example 4.

FIG. 15 shows the relationship between the gradation level of an input green signal (input gradation level) and the gradation level of each sub pixel (output gradation level) in this example. In the example shown in FIG. 15, display is provided using the green sub pixel G, the yellow sub pixel Ye and the cyan sub pixel C both in the first range r1 and the second range r2.

As shown in FIG. 15, the increasing ratios of the gradation levels of the green sub pixel G, the yellow sub pixel Ye and the cyan sub pixel C are different between the first range r1 and the second range r2.

The output increasing ratio of the green sub pixel G is lower in the second range r2 than in the first range r1, and is more specifically zero in the second range r2. The gradation level of the green sub pixel G increases as the gradation level of the green signal increases, reaches the maximum level (i.e., 255) at the intermediate level La of the green signal, and stays constant after that.

The output increasing ratios of the yellow sub pixel Ye and the cyan sub pixel C are also lower in the second range r2 than in the first range r1, and are more specifically zero in the second range r2. The gradation levels of the yellow sub pixel Ye and the cyan sub pixel C increase as the gradation level of the green signal increases, reach the maximum level (114 and 40 respectively) at the intermediate level La of the green signal, and stay constant after that.

In the example shown in FIG. 15, in the second range r2, the output increasing ratios of the green sub pixel G, the yellow sub pixel Ye and the cyan sub pixel C are zero. Therefore, the color displayed by the pixel stays the same in the second range r2. Namely, the hue, chroma and lightness of the color displayed by the pixel is constant in the second range r2.

Figure 16:
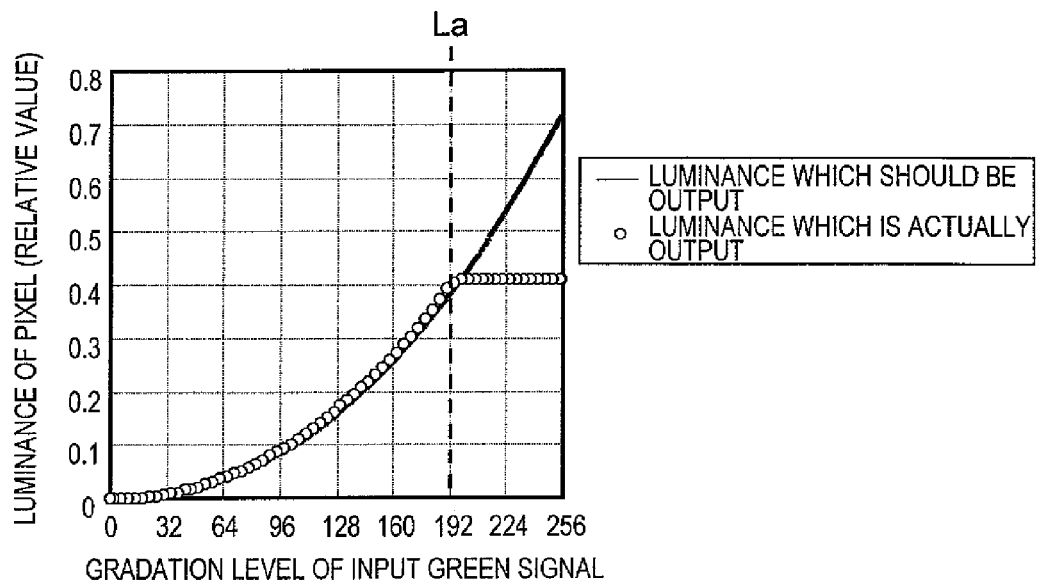
FIG. 16 is a graph showing the relationship between the gradation level of the green signal and the luminance of the pixel (relative value) in Example 4.
Figure 17:
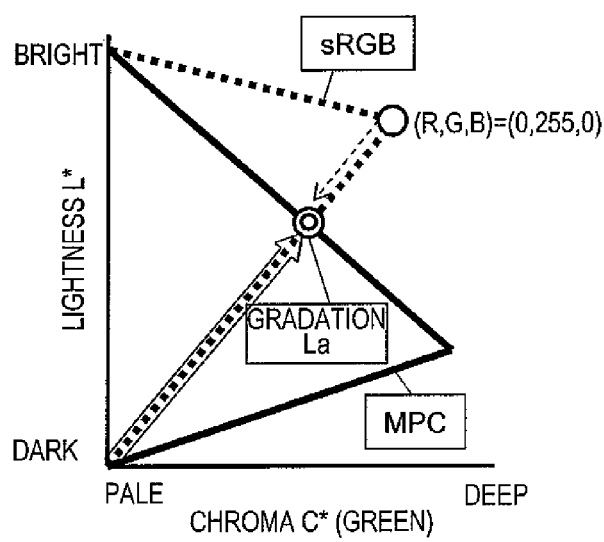
FIG. 17 is a graph showing the C*-L* characteristics of the color displayed by the pixel (the relationship between the chroma and the lightness of the hue corresponding to green in the sRGB) in Example 4.

FIG. 16 shows the relationship between the gradation level of the green signal and the luminance of the pixel (relative value) when the display is provided as shown in FIG. 15. FIG. 17 shows the C*-L* characteristics of the color displayed by the pixel (the relationship between the chroma and the lightness of the hue corresponding to green in the sRGB) also when the display is provided as shown in FIG. 15.

As shown in FIG. 16, when the gradation level of the green signal is in the range from the minimum level (0) to the intermediate level La (192 in this example), the luminance which is actually output substantially matches the luminance which should be output. By contrast, when the gradation level of the green signal is in the range from the intermediate level La to the maximum level (255), the luminance which is actually output is constant. Therefore, as shown in FIG. 17, the lightness of the color displayed by the pixel substantially matches the lightness of green in the sRGB in the first range r1 but is constant in the second range r2.

In addition, as understood from FIG. 17, the chroma of the color displayed by the pixel substantially matches the chroma of green in the sRGB in the first range r1, but is constant in the second range r2. In addition, as understood from that the locus of the color displayed by the pixel is represented in one color tone diagram (FIG. 17), the hue of the color displayed by the pixel substantially matches the hue of green in the sRGB (namely, the hue is constant in both of the first range r1 and the second range r2).

Figure 18:
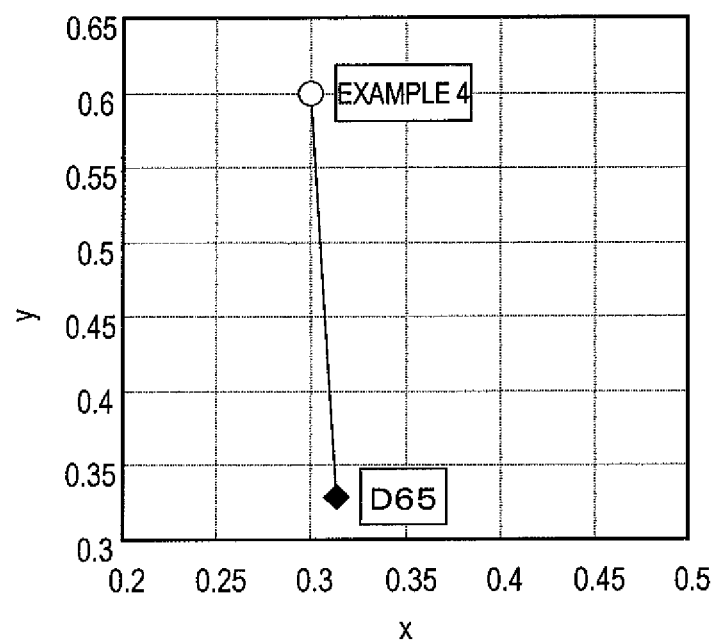
FIG. 18 is a graph showing the chromaticity values x and y of the color displayed by the pixel when a green signal is input in Example 4.

FIG. 18 shows the chromaticity values x and y of the color displayed by the pixel when a green signal is input in the example shown in FIG. 15 (Example 4). FIG. 18 also shows the chromaticity of white light from the D65 light source. As shown in FIG. 18, the chromaticity obtained when the green light is input is the same regardless of the gradation level of the green light.

As described above, when the display is provided as in this example, in the second range r2, the hue, chroma and lightness are constant. Therefore, a color having chromaticity coordinates substantially matching those of green in the sRGB is displayed throughout the first range r1 and the second range r2. Namely, in the second range r2, the lightness is slightly lower than the lightness to be output, but green of substantially the same hue as green in the sRGB can be displayed in the state where the chroma is at the highest possible level realized by the multiple primary color liquid crystal display device 100.

In the example shown in FIG. 15, in the first range r1, the output increasing ratio of the yellow sub pixel Ye is higher than that of the cyan sub pixel C. Which of the output increasing ratios of the yellow sub pixel Ye and the cyan sub pixel C is higher or lower is not limited to this. Depending on the specifications of the liquid crystal display panel 10, the output increasing ratio of the cyan sub pixel C may be higher than that of the yellow sub pixel Ye in the first range r1.

The gradation levels of the yellow sub pixel Ye and the cyan sub pixel C when the gradation level of the green signal is in the second range r2 are not limited to the values shown in FIG. 15 (114, 40).

EXAMPLE 5

Figure 19:
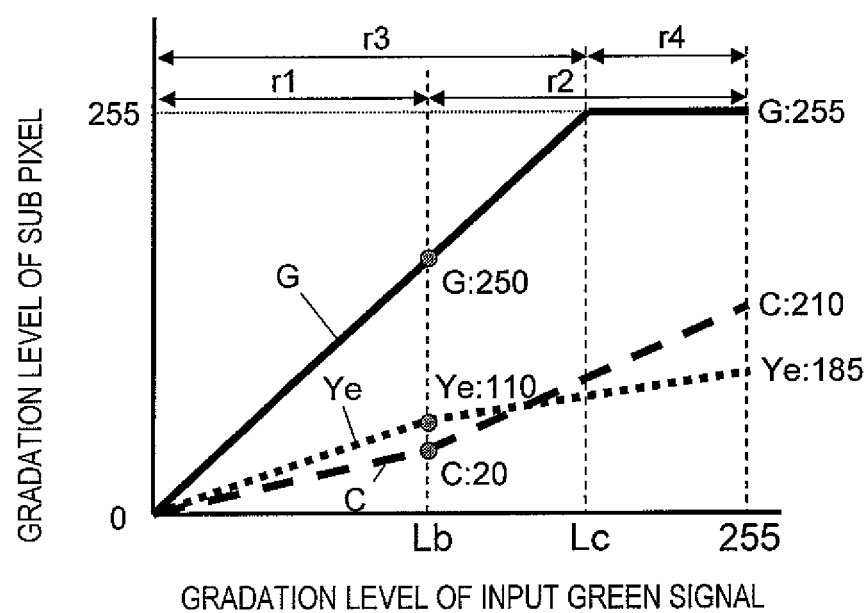
FIG. 19 is a graph showing the relationship between the gradation level of an input green signal (input gradation level) and the gradation level of each of sub pixels (output gradation level) in Example 5.

FIG. 19 shows the relationship between the gradation level of an input green signal (input gradation level) and the gradation level of each sub pixel (output gradation level) in this example. In the example shown in FIG. 19, display is provided using the green sub pixel G, the yellow sub pixel Ye and the cyan sub pixel C in the entire gradation level range of the green signal.

As shown in FIG. 19, the output increasing ratios of the yellow sub pixel Ye and the cyan sub pixel C are different between in a first range r1 of gradation level of the green signal, which is from the minimum level to a first intermediate level Lb, and in a second range r2 of gradation level of the green signal, which is from the first intermediate level Lb to the maximum level. The output increasing ratio of the green sub pixel G is different between a third range r3 of gradation level of the green signal, which is from the minimum level to a second intermediate level Lc, and a fourth range r4 of gradation level of the green signal, which is from the second intermediate level Lc to the maximum level. The second intermediate level Lc is higher than the first intermediate level Lb.

The output increasing ratio of the yellow sub pixel Ye is lower in the second range r2 than in the first range r1, but is not zero in the second range r2. The output increasing ratio of the cyan sub pixel C is higher in the second range r2 than in the first range r1. In addition, in the first range r1, the output increasing ratio of the yellow sub pixel Ye is higher than that of the cyan sub pixel C. In the second range r2, the output increasing ratio of the cyan sub pixel C is higher than that of the yellow sub pixel Ye. Therefore, when the gradation level of the green signal is the first intermediate level Lb, the gradation level of the yellow sub pixel Ye is higher than that of the cyan sub pixel C. When the gradation level of the green signal is the maximum level (255), the gradation level of the cyan sub pixel C is higher than that of the yellow sub pixel Ye. When the gradation level of the green signal is the first intermediate level Lb, the gradation levels of the yellow sub pixel Ye and the cyan sub pixel C are, for example, 110 and 20 respectively. When the gradation level of the green signal is the maximum level, the gradation levels of the yellow sub pixel Ye and the cyan sub pixel C are, for example, 185 and 210 respectively.

The output increasing ratio of the green sub pixel G is lower in the fourth range r4 than in the third range r3, and is more specifically is zero in the fourth range r4. Namely, the gradation level of the green sub pixel G increases as the gradation level of the green signal increases, reaches the maximum level (i.e., 255) at the second intermediate level Lc of the green signal, and stays constant after that. When the gradation level of the green signal is the first intermediate level Lb, the gradation level of the green sub pixel G is, for example, 250.

Figure 20:
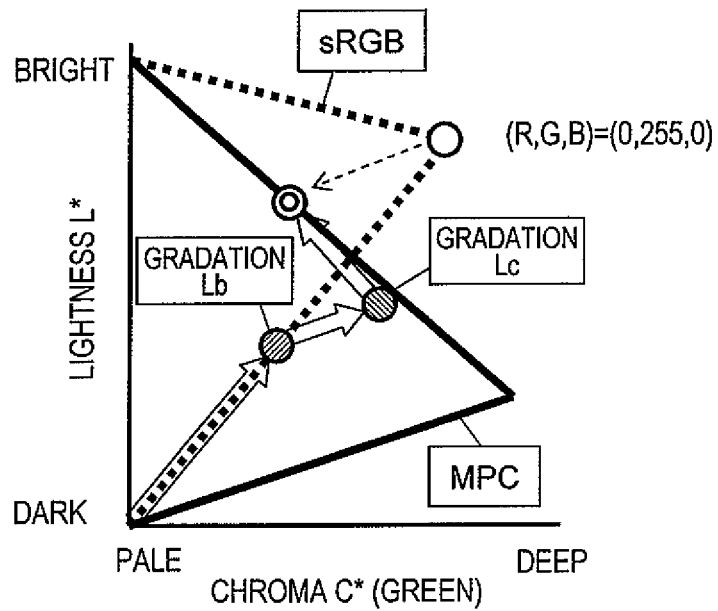
FIG. 20 is a graph showing the C*-L* characteristics of the color displayed by the pixel (the relationship between the chroma and the lightness of the hue corresponding to green in the sRGB) in Example 5.

As seen from this, in this example, the input gradation level at which the output increasing ratio changes is different between the green sub pixel G, and the yellow sub pixel Ye and the cyan sub pixel C. FIG. 20 shows the C*-L* characteristics of the color displayed by the pixel (the relationship between the chroma and the lightness of the hue corresponding to green in the sRGB) when the display is provided as shown in FIG. 19.

As shown in FIG. 20, in the first range r1, the lightness of the color displayed by the pixel substantially matches the lightness of green in the sRGB. By contrast, in the second range r2, the lightness of the color displayed by the pixel is lower than the lightness of green in the sRGB.

In addition, as understood from FIG. 20, in the first range r1, the chroma of the color displayed by the pixel substantially matches the chroma of green in the sRGB. By contrast, in a range from a starting end of the second range r2 (first intermediate level Lb) to a specified gradation level, the chroma of the color displayed by the pixel is higher than the chroma of green in the sRGB. In a range from the specified gradation level to a termination end of the second range r2 (maximum level), the chroma of the color displayed by the pixel is lower than the chroma of green in the sRGB.

As understood from that the locus of the color displayed by the pixel is represented in one color tone diagram (FIG. 20), the hue of the color displayed by the pixel substantially matches the hue of green in the sRGB.

As understood from a comparison of FIG. 11 and FIG. 20, in this example, the range of chroma which is output in the second range r2 is wider than that in Example 3. Therefore, when a gradation display of green is provided by the multiple primary color liquid crystal display device 100, natural and smooth gradation can be provided in any area from black via green to white.

It is preferable that the first intermediate level Lb, which is a termination end of the first range r1 (the range in which all of the hue, chroma and lightness can be reproduced with fidelity), is a gradation level at which the Y value of green to be displayed (green corresponding to the green signal) is 0.3 or greater for the same reason described regarding the intermediate level La in Example 1.

In the example shown in FIG. 19, in the first range r1, the output increasing ratio of the yellow sub pixel Ye is higher than that of the cyan sub pixel C; and in the second range r2, the output increasing ratio of the cyan sub pixel C is higher than that of the yellow sub pixel Ye. Which of the output increasing ratios of the yellow sub pixel Ye and the cyan sub pixel C is higher or lower is not limited to this. Depending on the specifications of the liquid crystal display panel 10, the output increasing ratio of the cyan sub pixel C may be higher than that of the yellow sub pixel Ye in the first range r1, and the output increasing ratio of the yellow sub pixel Ye may be higher than that of the cyan sub pixel C in the second range r2.

In the example shown in FIG. 19, the output increasing ratio of the cyan sub pixel C is higher in the second range r2 than in the first range r1. Alternatively, the output increasing ratio of the cyan sub pixel C may be lower in the second range r2 than in the first range r1.

The gradation levels of the green sub pixel G, the yellow sub pixel Ye and the cyan sub pixel C when the gradation level of the green signal is the first intermediate level Lb are not limited to the values shown in FIG. 19 (250, 110, 20). The gradation levels of the yellow sub pixel Ye and the cyan sub pixel C when the gradation level of the green signal is the maximum level are not limited to the values shown in FIG. 19 (185, 210).

EXAMPLE 6

Figure 21:
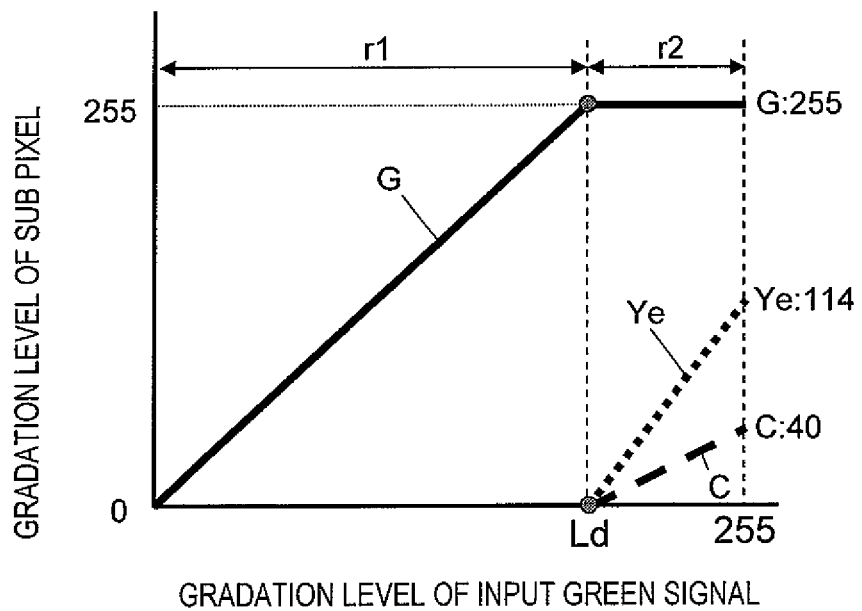
FIG. 21 is a graph showing the relationship between the gradation level of an input green signal (input gradation level) and the gradation level of each of sub pixels (output gradation level) in Example 6.

FIG. 21 shows the relationship between the gradation level of an input green signal (input gradation level) and the gradation level of each sub pixel (output gradation level) in this example. In the example shown in FIG. 21, when the gradation level of the green signal is in a first range r1 from the minimum level (i.e., zero) to a prescribed intermediate level Ld, display is provided using only the green sub pixel G. When the gradation level of the green signal is in a second range r2 from the intermediate level Ld to the maximum level (i.e., 255), display is provided using the yellow sub pixel Ye and the cyan sub pixel C in addition to the green sub pixel G.

As shown in FIG. 21, the output increasing ratio of the green sub pixel G is different between the first range r1 and the second range r2.

The output increasing ratio of the green sub pixel G is lower in the second range r2 than in the first range r1, and is more specifically zero in the second range r2. Namely, the gradation level of the green sub pixel G increases as the gradation level of the green signal increases, reaches the maximum level (i.e., 255) at the intermediate level La of the green signal, and stays constant after that.

The output increasing ratio of the yellow sub pixel Ye is higher than that of the cyan sub pixel C in the first range r1. Therefore, when the gradation level of the green signal is the maximum level (255), the gradation level of the yellow sub pixel Ye is higher than that of the cyan sub pixel C. When the gradation level of the green signal is the maximum level, the gradation levels of the yellow sub pixel Ye and the cyan sub pixel C are, for example, 114 and 40 respectively.

Figure 22:
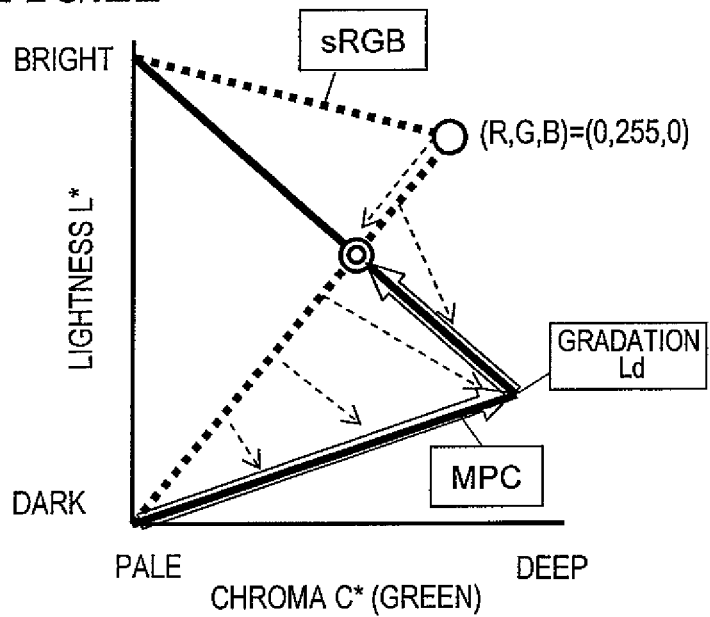
FIG. 22 is a graph showing the C*-L* characteristics of the color displayed by the pixel (the relationship between the chroma and the lightness of the hue corresponding to green in the sRGB) in Example 6.

FIG. 22 shows the C*-L* characteristics of the color displayed by the pixel (the relationship between the chroma and the lightness of the hue corresponding to green in the sRGB) when the display is provided as shown in FIG. 21.

As shown in FIG. 22, the locus of the color displayed by the pixel is along the outer perimeter of the color reproduction range of the multiple primary color liquid crystal display device 100. Namely, in this example, unlike in Examples 1 through 5 described above, neither the chroma nor the lightness is output with fidelity in the first range r1. It should be noted, though, this example is different from the conventional example described above with reference to FIG. 28 through FIG. 30 on the following points.

In the conventional example, as shown in FIG. 28, the gradation level of the green signal is the gradation level of the green sub pixel G. Therefore, as shown in FIG. 30, when the gradation level of the green signal is the maximum level, green having the highest chroma (i.e., deepest) is displayed by the pixel.

By contrast, in this example, when the gradation level of the green signal is the intermediate level Ld, the gradation level of the green sub pixel G is the maximum level and green having the highest chroma is displayed by the pixel. When the gradation level of the green signal is higher than the intermediate level Ld, the gradation levels of the yellow sub pixel Ye and the cyan sub pixel C are increased. In accordance with this, the lightness of green displayed by the pixel is increased and the chroma is decreased (i.e., the chromaticity is shifted toward white).

Therefore, as shown in FIG. 22, the locus of the color displayed by the pixel in this example includes green having a higher lightness than the locus of the color displayed by the pixel in the conventional example (shown in FIG. 30). Accordingly, in this example, the lightness obtained when the green signal is input is made higher than that in the conventional example. The locus of the color displayed by the pixel in this example is longer than the locus of the color displayed by the pixel in the conventional example. Therefore, in this example, natural gradation can be provided.

In the example shown in FIG. 21, in the second range r2, the output increasing ratio of the yellow sub pixel Ye is higher than that of the cyan sub pixel C. Which of the output increasing ratios of the yellow sub pixel Ye and the cyan sub pixel C is higher or lower is not limited to this. Depending on the specifications of the liquid crystal display panel 10, the output increasing ratio of the cyan sub pixel C may be higher than that of the yellow sub pixel Ye in the second range r2.

The gradation levels of the yellow sub pixel Ye and the cyan sub pixel C when the gradation level of the green signal is the maximum level are not limited to the values shown in FIG. 21 (114, 40).

It is preferable that the intermediate level Ld, which is a termination end of the first range r1 (the input gradation level at which the gradation level of the green sub pixel G reaches the maximum level), is a gradation level at which the Y value of green to be displayed (green corresponding to the green signal) is 0.3 or greater for the same reason described regarding the intermediate level La in Example 1.

(Specific Structure of the Signal Conversion Circuit)

Now, an example of specific structure of the signal conversion circuit 20 will be described.

The signal conversion circuit 20 has, for example, a lookup table containing data which represents the luminances of sub pixels regarding colors specified by video signals (three-dimensional signals). Owing to this, the signal conversion circuit 20 can refer to the lookup table in accordance with the input video signal to generate a multiple primary color signal. However, if the data which represents the luminances of sub pixels regarding all the colors is contained in the lookup table, the data amount of the lookup table is too large, and it is difficult to structure such a lookup table in a simple manner using a low-cost memory having a small capacity.

Figure 23:
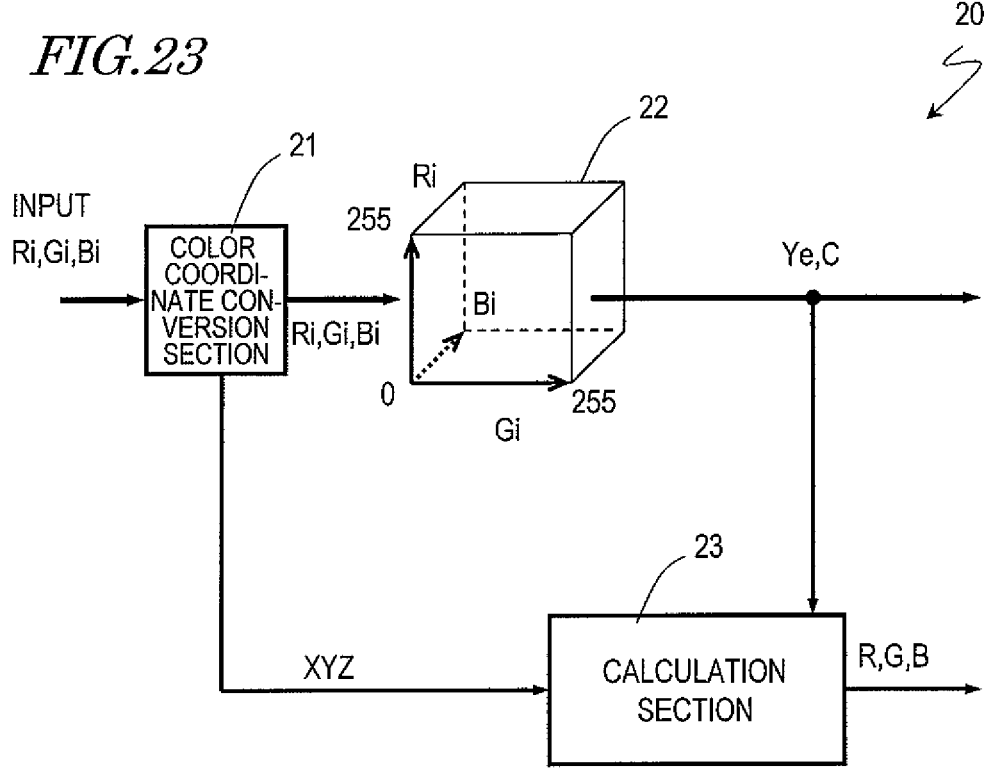
FIG. 23 is a block diagram showing an example of preferable structure of a signal conversion circuit included in the liquid crystal display device 100.

FIG. 23 shows an example of preferable structure of the signal conversion circuit 20. The signal conversion circuit 20 shown in FIG. 23 includes a color coordinate conversion section 21, a lookup table memory 22, and a calculation section 23.

The color coordinate conversion section 21 receives a video signal representing the luminances of the three primary colors and converts color coordinates in the RGB color space into color coordinates in the XYZ color space. Specifically, the color coordinate conversion section 21 performs matrix conversion on a RGB signal (including components Ri, Gi and Bi corresponding to the respective luminances of red, green and blue) to obtain XYZ values as represented by expression (1) below. The 3×3 matrix shown in expression (1) as an example is defined by the BT.709 standard.

[Expression 1]

$$\begin{pmatrix} X \\ Y \\ Z \end{pmatrix} = \begin{pmatrix} 0.4124 & 0.3576 & 0.1804 \\ 0.2127 & 0.7152 & 0.0722 \\ 0.0193 & 0.1192 & 0.9502 \end{pmatrix} \begin{pmatrix} Ri \\ Gi \\ Bi \end{pmatrix} \quad (1)$$

In the lookup table memory 22, the lookup table is stored. The lookup table has data representing the luminances of the yellow sub pixel Ye and the cyan sub pixel C corresponding to the luminances Ri, Gi and Bi of the three primary colors represented by the video signal. Here, the luminances Ri, Gi and Bi are obtained by performing inverse γ correction on the gradation values represented by 256 levels. The number of colors which can be specified by the video signal is 256×256×256. The lookup table in the lookup table memory 22 has 256×256×256 pieces of data of a three-dimensional matrix structure corresponding to the number of colors which can be specified by the video signal. By referring to the lookup table in the lookup table memory 22, the luminances of the yellow sub pixel Ye and the cyan sub pixel C corresponding to the luminances Ri, Gi and Bi can be obtained.

The calculation section 23 performs a calculation using the XYZ values obtained by the color coordinate conversion section 21 and also the luminances of the yellow sub pixel Ye and the cyan sub pixel C obtained by the lookup table memory 22, and thus finds the luminances of the red sub pixel R, the green sub pixel G and the blue sub pixel B. Specifically, the calculation section 23 performs a calculation in accordance with the following expression (2).

[Expression 2]

$$\begin{pmatrix} R \\ G \\ B \end{pmatrix} = \begin{pmatrix} X_R & X_G & X_B \\ Y_R & Y_G & Y_B \\ Z_R & Z_G & Z_B \end{pmatrix}^{-1} \begin{pmatrix} X - (X_{Ye} \times Ye + X_C \times C) \\ Y - (Y_{Ye} \times Ye + Y_C \times C) \\ Z - (Z_{Ye} \times Ye + Z_C \times C) \end{pmatrix} \quad (2)$$

Hereinafter, a reason why the luminances of the red sub pixel R, the green sub pixel G and the blue sub pixel B are found by performing the calculation of expression (2) will be described with reference to the following expressions (3) and (4).

[Expression 3]

$$\begin{pmatrix} X \\ Y \\ Z \end{pmatrix} = \begin{pmatrix} X_R & X_G & X_B & X_{Ye} & X_C \\ Y_R & Y_G & Y_B & Y_{Ye} & Y_C \\ Z_R & Z_G & Z_B & Z_{Ye} & Z_C \end{pmatrix} \begin{pmatrix} R \\ G \\ B \\ Ye \\ C \end{pmatrix} \quad (3)$$

[Expression 4]

$$\begin{pmatrix} X \\ Y \\ Z \end{pmatrix} = \begin{pmatrix} X_R & X_G & X_B \\ Y_R & Y_G & Y_B \\ Z_R & Z_G & Z_B \end{pmatrix} \begin{pmatrix} R \\ G \\ B \end{pmatrix} + \begin{pmatrix} X_{Ye} & X_C \\ Y_{Ye} & Y_C \\ Z_{Ye} & Z_C \end{pmatrix} \begin{pmatrix} Ye \\ C \end{pmatrix} \quad (4)$$

Where the color specified by the video signal input to the signal conversion circuit 20 and the color specified by the multiple primary color signal output from the signal conversion circuit 20 are the same, the XYZ values obtained by converting the luminances Ri, Gi and Bi of the three primary colors are, as shown in expression (3), also represented by the matrix conversion expression on the luminances of the red sub pixel R, the green sub pixel G, the blue sub pixel B, the yellow sub pixel Ye and the cyan sub pixel C. The coefficients of the 3 (row)×5 (column) conversion matrix shown in expression (3), i.e., $X_R, Y_R$ and $Z_R \ldots Z_C$ are determined based on the XYZ values of each sub pixel in the liquid crystal display panel 10.

As shown in expression (4), the right side of expression (3) can be deformed to a sum of the luminances of the red sub pixel R, the green sub pixel G and the blue sub pixel B (represented as R, G and B in the expression) multiplied by the 3 (row)×3 (column) conversion matrix and the luminances of the yellow sub pixel Ye and the cyan sub pixel C (represented as Ye and C in the expression) multiplied by the 3 (row)×2 (column) conversion matrix. By further deforming expression (4), expression (2) is obtained. Hence, by performing the calculation in accordance with expression (2), the luminances of the red sub pixel R, the green sub pixel G and the blue sub pixel B can be found.

As seen from this, the calculation section 23 can obtain the luminances of the red sub pixel R, the green sub pixel G and the blue sub pixel B based on the XYZ values obtained by the color coordinate conversion section 21 and the luminances of the yellow sub pixel Ye and the cyan sub pixel C obtained by the lookup table memory 22.

As described above, the signal conversion circuit 20 shown in FIG. 23 first uses the lookup table stored on the lookup table memory 22 to find the luminances of the two sub pixels, and then finds the luminances of the remaining three sub pixels by the calculation section 23. Accordingly, the lookup table stored on the lookup table memory 22 does not need to contain data representing the luminances of all the five sub pixels, and only needs to contain data representing the luminances of the two sub pixels among the five sub pixels. Therefore, by adopting the structure as shown in FIG. 23, a lookup table can be formed in a simple manner using a low-cost memory having a small capacity.

Figure 24:
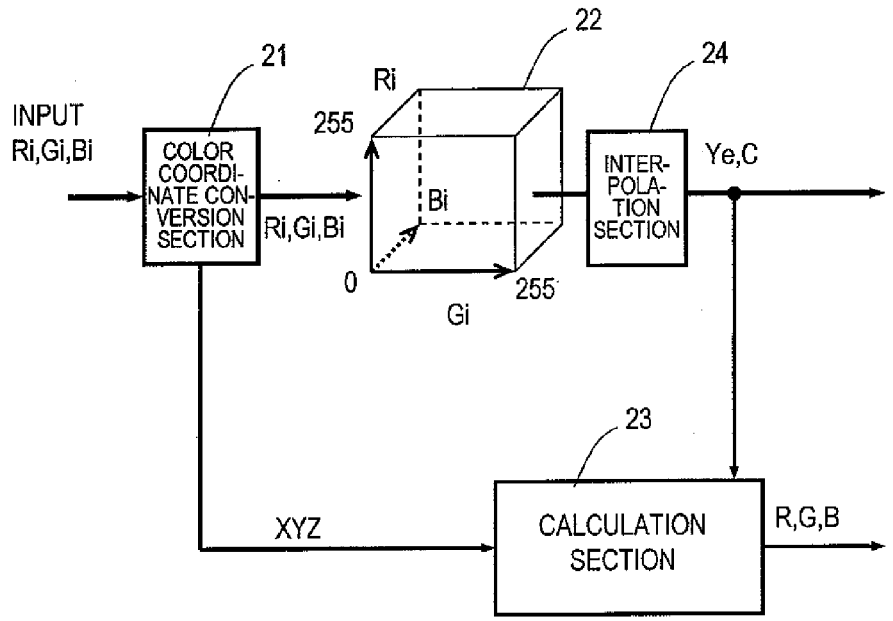
FIG. 24 is a block diagram showing another example of preferable structure of a signal conversion circuit included in the liquid crystal display device 100.
Figure 25:
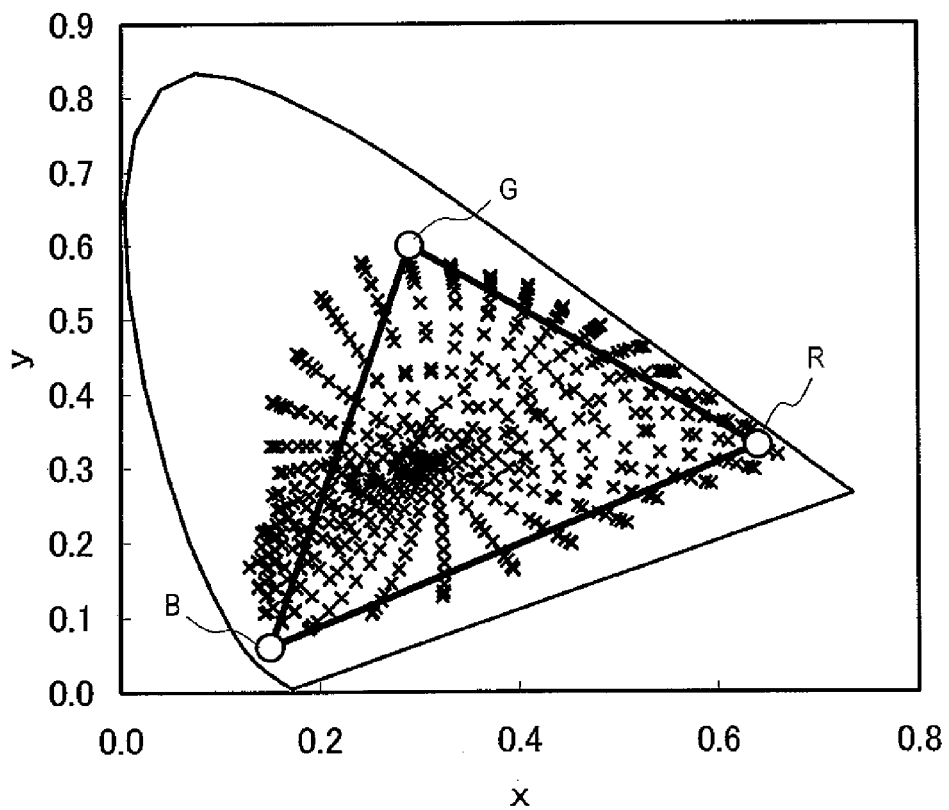
FIG. 25 is an xy chromaticity diagram showing a color reproduction range of a conventional display device for providing display using the three primary colors.
Figure 26:
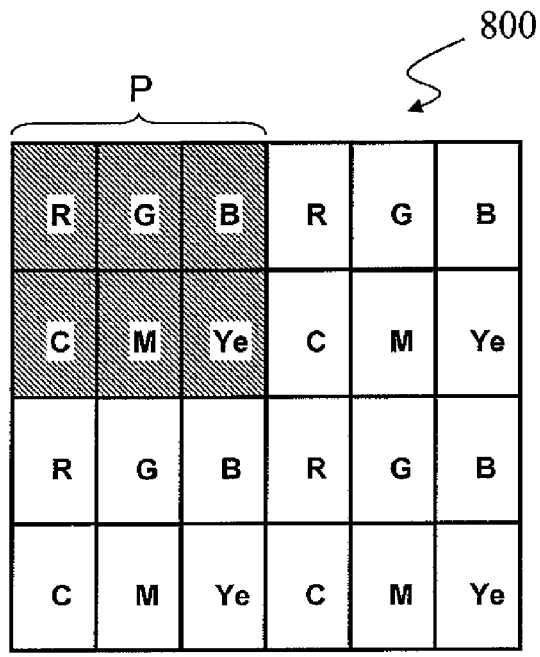
FIG. 26 schematically shows a conventional multiple primary color liquid crystal display device 800.
Figure 27:
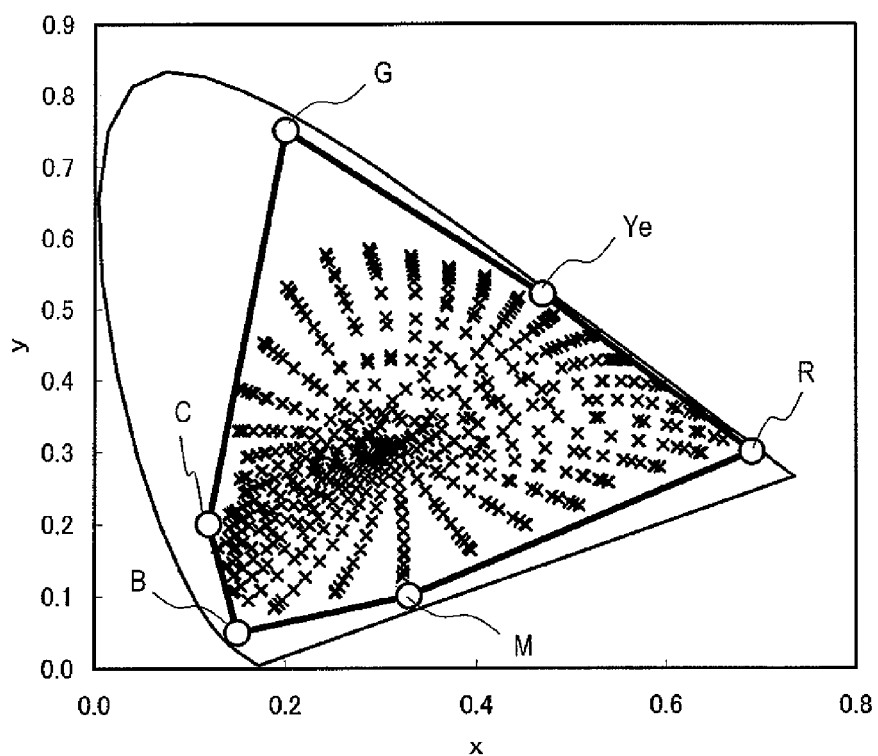
FIG. 27 is an xy chromaticity diagram showing a color reproduction range of the multiple primary color liquid crystal display device 800.

FIG. 24 shows another example of preferable structure of the signal conversion circuit 20. Unlike the signal conversion circuit 20 shown in FIG. 23, the signal conversion circuit 20 shown in FIG. 24 includes an interpolation section 24 in addition to the color coordinate conversion section 21, the lookup table memory 22 and the calculation section 23.

In the signal conversion circuit 20 shown in FIG. 23, the data in the lookup table stored on the lookup table memory 22 corresponds to the same number of colors as the number of colors specified by the video signal. By contrast, in the signal conversion circuit 20 shown in FIG. 24, the data in the lookup table corresponds to a smaller number of colors than the number of colors specified by the video signal.

In this example, the luminances Ri, Gi and Bi of the three primary colors represented by the video signal each have 256 gradation levels, and the number of colors specified by the video signal is 256×256×256. The lookup table in the lookup table memory 22 has 17×17×17 pieces of data of a three-dimensional matrix structure corresponding to every 16th gradation level, for example, levels 0, 16, 32, . . . 256, for each of the luminances Ri, Gi and Bi. Namely, the lookup table has 17×17×17 pieces of data obtained by culling out a part of the 256×256×256 pieces of data.

The interpolation section 24 uses the data contained in the lookup table (the luminances of the yellow sub pixel and the cyan sub pixel) to interpolate the luminances of the yellow sub pixel Ye and the cyan sub pixel C corresponding to the culled out gradation levels. The interpolation section 24 performs the interpolation by, for example, linear approximation. In this manner, the luminances of the yellow sub pixel Ye and the cyan sub pixel C corresponding to the luminances Ri, Gi and Bi of the three primary colors can be obtained for all the gradation levels.

The calculation section 23 finds the luminances of the red sub pixel R, the green sub pixel G and the blue sub pixel B using the XYZ values obtained by the color coordinate conversion section 21 and the luminances of the yellow sub pixel Ye and the cyan sub pixel C obtained by the lookup table memory 22 and the interpolation section 24.

As described above, in the signal conversion circuit 20 shown in FIG. 24, the number of colors corresponding to the data in the lookup table stored on the lookup table memory 22 is smaller than the number of colors specified by the video signal. Therefore, the data amount of the lookup table can be further reduced.

In the above example, the lookup table contains data representing the luminances of the yellow sub pixel Ye and the cyan sub pixel C, and the calculation section 23 finds the luminances of the remaining red sub pixel R, green sub pixel G and blue sub pixel B. The present invention is not limited to this. In the lookup table, data representing the luminances of any two sub pixels may be contained, and thus the calculation section 23 can find the luminances of the remaining three sub pixels.

In the case where the number of sub pixels defining one pixel is other than 5, the data amount of the lookup table can be reduced by a similar technique. Where the number of primary colors used for display is n, the signal conversion circuit 20 refers to the lookup table to obtain the luminances of (n−3) primary colors among the n primary colors (namely, luminance data on (n−3) primary colors is contained in the lookup table). Then, by performing a calculation using the luminances of the (n−3) primary colors, the luminances of the remaining three primary colors among the n primary colors can be found.

For example, in the case where one pixel is formed of four sub pixels, the signal conversion circuit 20 can refer to the lookup table to obtain the luminance of one sub pixel, and the calculation section 23 can perform a calculation to find the luminances of the remaining three sub pixels. In this case, the four sub pixels are, specifically, the red sub pixel, the green sub pixel, the blue sub pixel and the yellow sub pixel.

In the case where one pixel is formed of six sub pixels, the signal conversion circuit 20 can refer to the lookup table to obtain the luminances of three sub pixels, and the calculation section 23 can perform a calculation to find the luminances of the remaining three sub pixels. In this case, the six sub pixels are, for example, the red sub pixel, the green sub pixel, the blue sub pixel, the yellow sub pixel, the cyan sub pixel and a magenta sub pixel.

The components of the signal conversion circuit 20 may be realized by hardware, or may be partially or entirely realized by software. In the case where these components are realized by software, a computer may be used. Such a computer includes a CPU (Central Processing Unit) for executing various programs, a RAM (Random Access Memory) acting as a work area used for executing the programs, and the like. A program for realizing the function of each of the components is executed on the computer, and the computer is operated as these components.

The program may be supplied to the computer from a storage medium or via a communication network. The storage medium may be separable from the computer or built into the computer. Such a storage medium may be attachable to the computer such that the program stored thereon is directly readable by the computer, or may be attachable such that the program stored thereon is read via a program reading device connected as an external storage device to the computer. Usable storage mediums are, for example, tapes such as magnetic tapes, cassette tapes and the like; discs including magnetic discs such as flexible discs, hard discs and the like, magneto-optical discs such as MOs, MDs and the like, and optical discs such as CD-ROM discs, DVDs, CD-R discs and the like; cards such as IC cards (including memory cards), optical cards and the like; semiconductor memories such as mask ROMs, EPROMs (Erasable Programmable Read Only Memories), EEPROMs (Electrically Erasable Programmable Read Only Memories), flash ROMs and the like; etc. In the case where a program is supplied via a communication network, the program may be in the form of a carrier wave or a data signal having program codes thereof embodied by electronic transfer.

In the above description, the liquid crystal display device is used. The present invention is preferably applicable to various display devices such as CRTs (Cathode Ray Tubes), organic EL display devices, plasma display panels, SEDs (Surface-conduction Electron-emitter Displays) and the like.

INDUSTRIAL APPLICABILITY

According to the present invention, a multiple primary color display device which suppresses the reduction in the display quality when an input signal corresponding to green in the sRGB color space is input from outside is provided. The multiple primary color display device according to the present invention can provide high quality display and so is preferably usable for various electronic devices such as liquid crystal TVs and the like.

REFERENCE SIGNS LIST

10 Liquid crystal display panel
20 Signal conversion circuit
21 Color coordinate conversion section
22 Lookup table memory
23 Calculation section
24 Interpolation section
100 Liquid crystal display device

The invention claimed is:

1. A display device comprising a pixel defined by a plurality of sub pixels, wherein:
   the plurality of sub pixels include at least a red sub pixel for displaying red, a green sub pixel for displaying green, a blue sub pixel for displaying blue, and a yellow sub pixel for displaying yellow; and
   when an input signal corresponding to green in an sRGB color space is input from outside, display is provided using the yellow sub pixel in addition to the green sub pixel.

2. The display device of claim 1, wherein:
   the plurality of sub pixels further include a cyan sub pixel for displaying cyan; and
   when the input signal is input, display is provided using the cyan sub pixel in addition to the green sub pixel and the yellow sub pixel.

3. The display device of claim 2, wherein increasing ratios of gradation levels of the green sub pixel, the yellow sub pixel and the cyan sub pixel with respect to an increase of a gradation level of the input signal are different between a first range of gradation level of the input signal, which is from a minimum level to a prescribed intermediate level, and a second range of gradation level of the input signal, which is from the prescribed intermediate level to a maximum level.

4. The display device of claim 3, wherein when the gradation level of the input signal is the prescribed intermediate level, the gradation level of the green sub pixel is the maximum level, and the increasing ratio of the green sub pixel in the second range is zero.

5. The display device of claim 4, wherein in the first range, hue, chroma and lightness of green corresponding to the input signal substantially match hue, chroma and lightness of a color displayed by the pixel.

6. The display device of claim 5, wherein in the second range, the lightness of green corresponding to the input signal substantially matches the lightness of the color displayed by the pixel.

7. The display device of claim 6, wherein in the second range, the hue of green corresponding to the input signal substantially matches the hue of the color displayed by the pixel.

8. The display device of claim 5, wherein when the input signal is input, in the second range, display is provided using the blue sub pixel in addition to the green sub pixel, the yellow sub pixel, and the cyan sub pixel.

9. The display device of claim 5, wherein when the input signal is input, in the second range, the blue sub pixel is not used for display.

10. The display device of claim 5, wherein in the second range, the lightness of the color displayed by the pixel is lower than the lightness of green corresponding to the input signal.

11. The display device of claim 10, wherein in the second range, the hue of green corresponding to the input signal substantially matches the hue of the color displayed by the pixel.

12. The display device of claim 5, wherein in the second range, the hue, chroma and lightness of the color displayed by the pixel are constant.

13. The display device of claim 5, wherein the increasing ratios of the yellow sub pixel and the cyan sub pixel in the second range are zero.

14. The display device of claim 3, wherein the prescribed intermediate level is a gradation level at which a Y value of green corresponding to the input signal is 0.3 or greater where the Y value in an XYZ colorimetric system of white displayed by the pixel is 1.

15. The display device of claim 2, wherein:
increasing ratios of gradation levels of the yellow sub pixel and the cyan sub pixel with respect to an increase of a gradation level of the input signal are different between a first range of gradation level of the input signal, which is from a minimum level to a first intermediate level, and a second range of gradation level of the input signal, which is from the first intermediate level to a maximum level; and
an increasing ratio of a gradation level of the green sub pixel with respect to the increase of the gradation level of the input signal is different between a third range of gradation level of the input signal, which is from the minimum level to a second intermediate level higher than the first intermediate level, and a fourth range of gradation level of the input signal, which is from the second intermediate level to the maximum level.

16. The display device of claim 15, wherein when the gradation level of the input signal is the second intermediate level, the gradation level of the green sub pixel is the maximum level, and the increasing ratio of the green sub pixel in the fourth range is zero.

17. The display device of claim 16, wherein in the first range, hue, chroma and lightness of green corresponding to the input signal substantially match hue, chroma and lightness of a color displayed by the pixel.

18. The display device of claim 17, wherein in the second range, the hue of green corresponding to the input signal substantially matches the hue of the color displayed by the pixel.

19. The display device of claim 15, wherein the first intermediate level is a gradation level at which a Y value of green corresponding to the input signal is 0.3 or greater where the Y value in an XYZ colorimetric system of white displayed by the pixel is 1.

20. The display device of claim 1, wherein when a gradation level of the input signal is a maximum level, chromaticity values x and y and a Y value in an XYZ colorimetric system of the color displayed by the pixel fulfill the relationships of $0.25 \leq x \leq 0.35$, $0.45 \leq y \leq 0.70$, and $0.3 \leq Y \leq 0.8$, where the Y value when the pixel displays white is 1.

21. A display device comprising a pixel defined by a plurality of sub pixels, wherein:
the plurality of sub pixels include at least a red sub pixel for displaying red, a green sub pixel for displaying green, a blue sub pixel for displaying blue, and a yellow sub pixel for displaying yellow; and
when an input signal corresponding to green in an sRGB color space is input from outside, display is provided using only the green sub pixel in a first range of gradation level of the input signal, which is from a minimum level to a prescribed intermediate level, and display is provided using the yellow sub pixel in addition to the green sub pixel in a second range of gradation level of the input signal, which is from the prescribed intermediate level to a maximum level.

22. The display device of claim 21, wherein an increasing ratio of a gradation level of the green sub pixel with respect to an increase of the gradation level of the input signal is different between the first range and the second range.

23. The display device of claim 22, wherein when the gradation level of the input signal is the prescribed intermediate level, the gradation level of the green sub pixel is the maximum level, and the increasing ratio of the green sub pixel in the second range is zero.

24. The display device of claim 21, wherein:
the plurality of sub pixels further include a cyan sub pixel for displaying cyan; and
in the second range, display is provided using the cyan sub pixel in addition to the green sub pixel and the yellow sub pixel.

* * * * *